United States Patent
NewDelman et al.

(10) Patent No.: US 12,543,668 B2
(45) Date of Patent: Feb. 10, 2026

(54) APPARATUS FOR INJECTING CONSTITUENTS BY CONFINING THE CONSTITUENTS IN TUBES

(71) Applicant: SUB-MERGENT TECHNOLOGIES, INC., Lake Oswego, OR (US)

(72) Inventors: Mitchell J. NewDelman, Monte Carlo (MC); John A. Sanders, Austin, TX (US)

(73) Assignee: Sub-Mergent Technologies, Inc., Southlake, TX (US)

( * ) Notice: Subject to any disclaimer, the term of this patent is extended or adjusted under 35 U.S.C. 154(b) by 912 days.

(21) Appl. No.: 17/839,472

(22) Filed: Jun. 13, 2022

(65) Prior Publication Data
US 2023/0397549 A1  Dec. 14, 2023

(51) Int. Cl.
*A01G 29/00* (2006.01)
*A01G 24/60* (2018.01)
(Continued)

(52) U.S. Cl.
CPC .............. *A01G 25/06* (2013.01); *A01G 24/60* (2018.02); *A01G 25/16* (2013.01)

(58) Field of Classification Search
CPC ........ A01G 25/06; A01G 24/60; A01G 25/16; A01G 29/00; A01C 23/02; A01B 45/02;
(Continued)

(56) References Cited

U.S. PATENT DOCUMENTS

| | | | | |
|---|---|---|---|---|
| 5,134,774 A | * | 8/1992 | Porter | B23P 6/007 156/305 |
| 5,586,609 A | * | 12/1996 | Schuh | E21B 17/18 175/215 |

(Continued)

*Primary Examiner* — Edwin J Toledo-Duran
(74) *Attorney, Agent, or Firm* — Bailey Legal Services, PLLC

(57) ABSTRACT

Disclosed is an apparatus for injecting a plurality of constituents by confining the constituents in one or more tubes. The apparatus includes an outer tube (1015D); a global positioning satellite (GPS) (1113C); a programmable logic controller (PLC) (1105C); an Artificial intelligence (AI) robot (1107C, and 1205); a computer (1111C); an encoder (1305B); a plurality of limit switches (1405, 1407, and 1409), and a spacer tube (1015D). The outer tube (1015D) includes a plurality of stackable tubes (1003D, 1005D, 1007D, 1009D, 1011D, and 1013D). The stackable tubes (1003D, 1005D, 1007D, 1009D, 1011D, and 1013D) are stackable either in cylinder segments or polygonal shapes. Constituents confined therein or the stackable tubes (1003D, 1005D, 1007D, 1009D, 1011D, and 1013D) themselves may be ejected through apertures for injection purposes. Some constituent contents may be ejected vertically or laterally-through perforations in the tube wall sub-surface to enable constituent amendment or sequestration. The stackable tubes (1003D, 1005D, 1007D, 1009D, 1011D, and 1013D) may have apertures that when closed protects the constituents from soil or water penetration. The stackable tubes (1003D, 1005D, 1007D, 1009D, 1011D, and 1013D) may be ejected with Constituents partially sub-surface with the remaining length purposefully positioned above the surface. Living (Continued)

Organisms may be injected within specialty protective stackable tubes (1003D, 1005D, 1007D, 1009D, 1011D, and 1013D) that also provide habitat support after placement.

30 Claims, 23 Drawing Sheets

(51) Int. Cl.
    *A01G 25/06* (2006.01)
    *A01G 25/16* (2006.01)

(58) Field of Classification Search
    CPC ....... A01B 35/32; A01B 51/02; A01B 69/008; A01B 76/00; A01B 79/02
    See application file for complete search history.

(56) References Cited

U.S. PATENT DOCUMENTS

| | | | | |
|---|---|---|---|---|
| 6,102,484 | A * | 8/2000 | Young, III | E21C 37/12 |
| | | | | 166/177.5 |
| 2002/0056554 | A1* | 5/2002 | Hargreaves | A01B 45/023 |
| | | | | 172/21 |
| 2003/0155156 | A1* | 8/2003 | Livingstone | E21B 21/12 |
| | | | | 175/320 |
| 2004/0187752 | A1* | 9/2004 | Engelke | A01C 23/028 |
| | | | | 111/118 |
| 2006/0070959 | A1* | 4/2006 | Perkins | B01D 21/0012 |
| | | | | 210/756 |
| 2008/0011516 | A1* | 1/2008 | Piipponen | E21D 20/003 |
| | | | | 175/57 |
| 2010/0268469 | A1* | 10/2010 | Harrison | G01N 9/002 |
| | | | | 702/50 |
| 2011/0180173 | A1* | 7/2011 | Spies | F27D 3/145 |
| | | | | 138/111 |
| 2017/0080614 | A1* | 3/2017 | Lamm | E04B 1/7604 |
| 2018/0066519 | A1* | 3/2018 | Faulkner | E21D 20/028 |
| 2021/0132608 | A1* | 5/2021 | Cavender-Bares | A01B 51/02 |
| 2021/0144901 | A1* | 5/2021 | Tippery | A01B 3/50 |
| 2023/0031721 | A1* | 2/2023 | Stewart | G01F 1/74 |

* cited by examiner

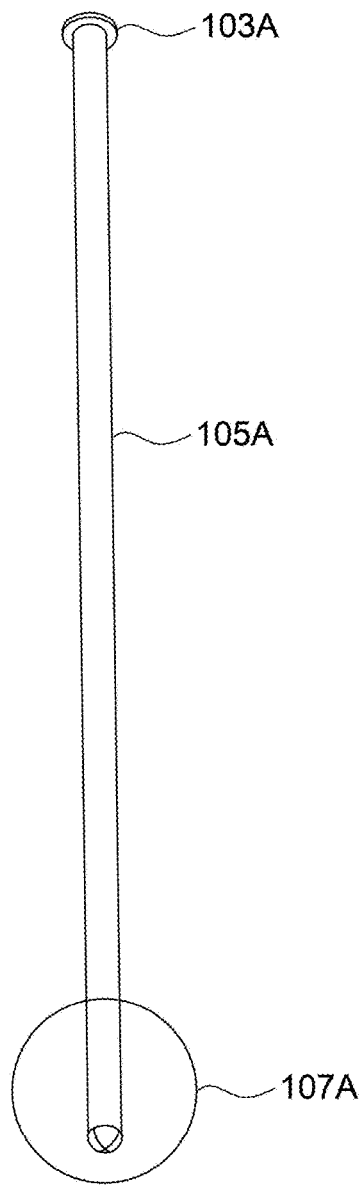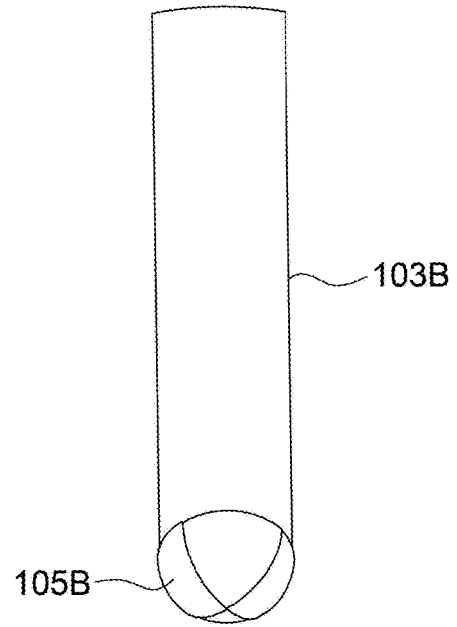
FIG. 1A
FIG. 1B

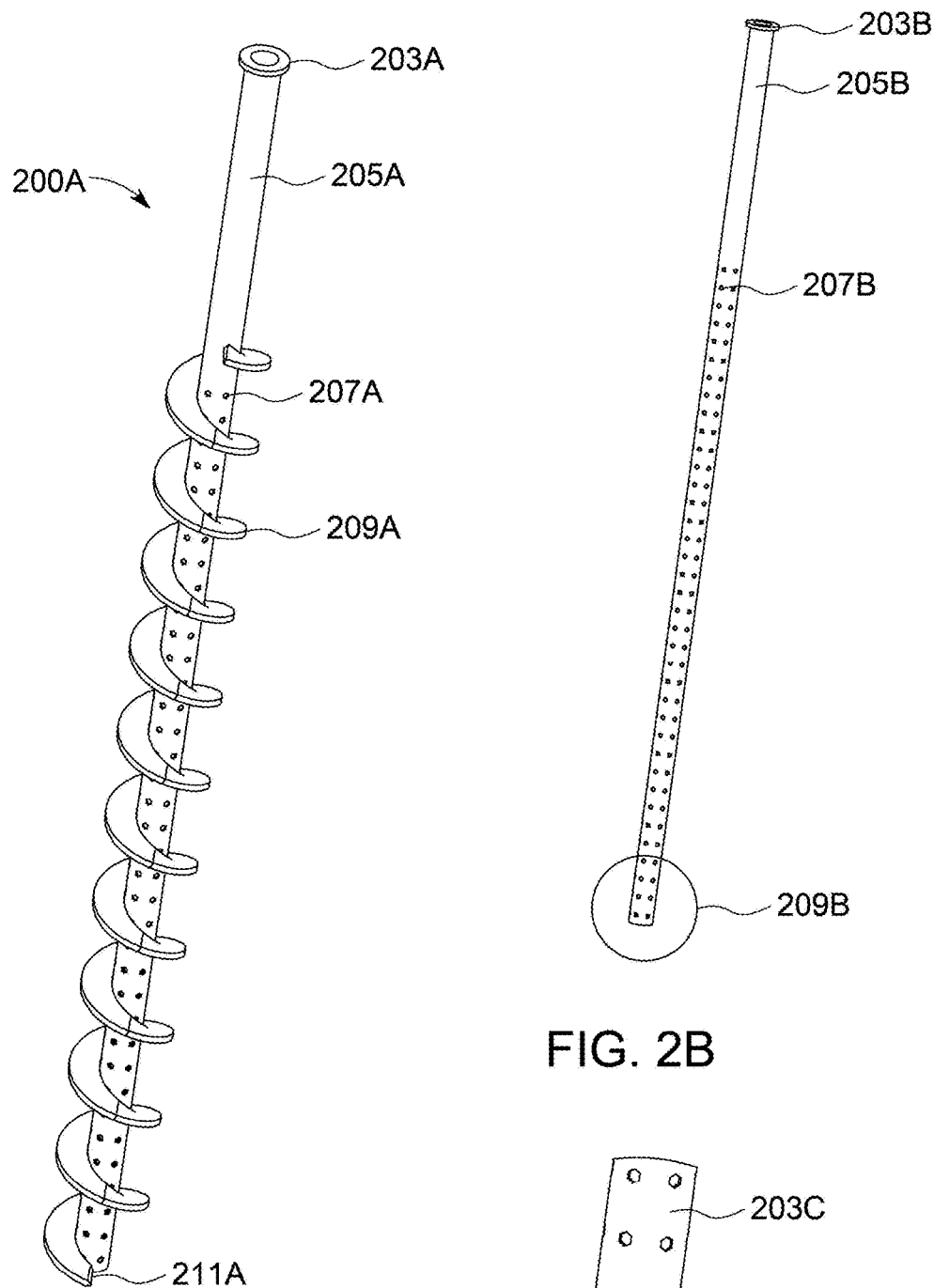

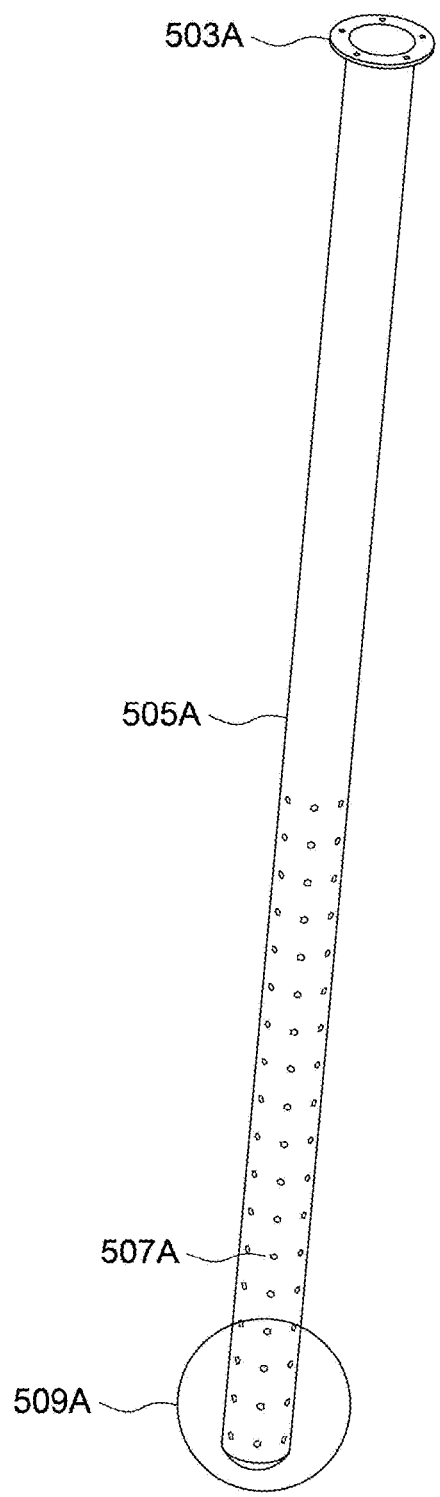
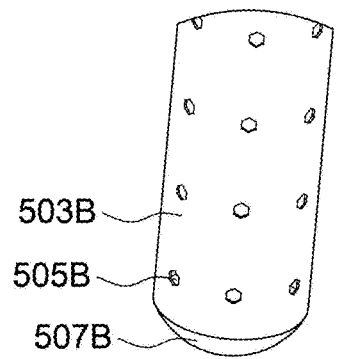
FIG. 5A
FIG. 5B

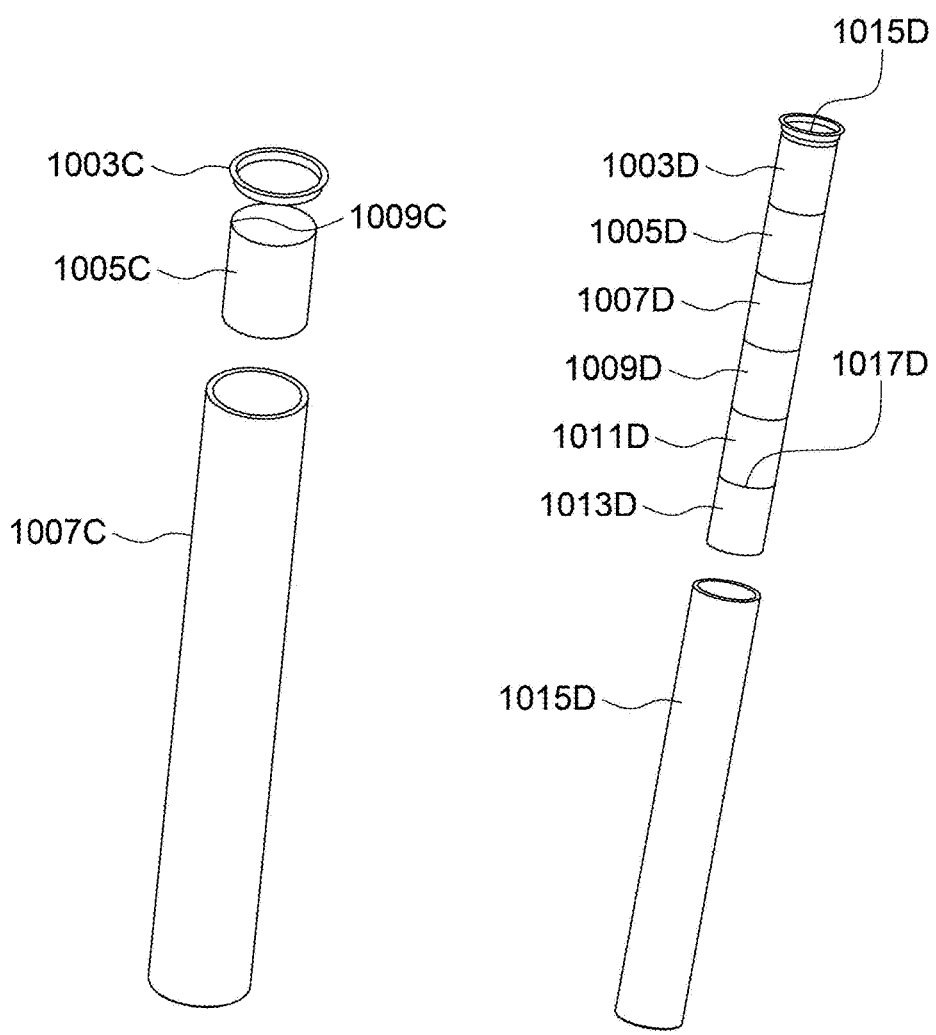

APPARATUS FOR INJECTING CONSTITUENTS BY CONFINING THE CONSTITUENTS IN TUBES

TECHNICAL FIELD

The present invention is generally related to an insert tube and a sub-surface injection system. More particularly, the present disclosure relates to an apparatus for injecting a plurality of constituents by confining the constituents in one or more tubes, with or without perforations, wherein the constituents are capable of being filled within a hollow shaft of an injection drill bit and subsequently the contents ejected through its perforations or apertures or the tube and constituents ejected through the bottom aperture of a hollow shaft of an injection drill bit.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With an expected world population of 9 billion by 2050, the need to produce more food and fiber is urgent. Currently, irrigated agriculture is more productive, yet large amounts of water are required to maintain maximum yields. Agricultural science strives to improve irrigation management to minimize water inputs while optimizing crop productivity.

Innovative irrigation management could help avoid negative environmental and economic consequences of over- or under-irrigation. Under irrigation affects crop quality and yield. Over-irrigation increases topsoil erosion and the potential of property contamination due to chemical flows. Water resource depletion could consequently increase a region's susceptibility to drought. Non-optimal irrigation can provoke losses to growers, to the local community, and hence, food security.

Optimally efficient irrigation is a function of soil water status across the root zone. Prescribed soil amendment materials, can be injected either for soil health or for water retention.

Further, soil amendment applying bio-char of many varieties has been examined for crop yield and quality as well as for regulating nitrogen level imbalances due to increased fertilizer use, fossil fuel consumption, and deforestation.

It is known that locally produced bio-char can improve the physical condition of light-textured soils important for crop growth through increased soil aggregate stability, porosity, and available water contents where it reduced soil bulk density. Reduced bulk density due to soil aggregation may aid root growth with more water available. Biochar application to highly weathered and sandy soils will, therefore, increase the soils' resilience against drought.

There is an ever-increasing array of discrete amendments being tried to enhance soil health and/or productivity at the surface or near-surface soil horizons, as well as some rudimentary soil health amendment spiking of soils. When referencing bio-char or other soil amendment application rates, the existing literature discusses topsoil spreading and sometimes mechanical blending down as far as 30 centimeters with surface disruption. However, there is no solution to targeted release through injection at and below the root zone with minimal surface disruption.

European patent application EP1203522A1 filed by Hargreaves Jonathan William et al. discloses Ground injection, e.g., aeration, apparatus adapted to be mounted on or drawn by a tractor and comprising one or more tines reciprocated vertically by a crank and crankshaft-driven from a motor. Each tine defines an internal passage with outlet apertures. A piston rod connected to each tine and a cylinder have a piston that forces air into a reservoir and via a line into the passage. The mechanism is timed such that a pulse of air is injected into the ground through outlet apertures at the position of maximum penetration of the ground by each tine. Instead of air, a liquid or other gaseous substance may be injected into the ground where it is penetrated by each tine. The apparatus may include two or more rows of such tines and associated injection means.

A PCT application WO 2020/020890 A1 filed by Reid Brian J et al. discloses a solid dosage form comprising biochar and at least one pesticide and/or at least one antimicrobial, wherein said biochar and said at least one pesticide and/or said at least one antimicrobial is homogeneously mixed in said dosage form and said dosage form does not have a layered structure. The invention also provides a method for preparing the dosage form, a liquid composition comprising the dosage form, and a method of controlling pests using the dosage form.

However, none of these prior arts talk about targeted injection(s) at or below the horizon A and or below 30 cm from the surface.

This specification recognizes that there is a need for an efficient apparatus to injection down to various targeted root zone sections and/or at sub-root-zone soil horizons for soil health and hence enhanced yield and/or for water retention modification for draught resilience. Further, there is a need for an apparatus to facilitate access to sub-root zone horizons as potential massive carbon sinks for certifiable carbon sequestration.

Thus, in view of the above, there is a long-felt need in the industry to address the aforementioned deficiencies and inadequacies.

Further limitations and disadvantages of conventional and traditional approaches will become apparent to one having skill in the art through comparison of described systems with some aspects of the present disclosure, as set forth in the remainder of the present application and with reference to the drawings.

SUMMARY OF THE INVENTION

An apparatus for injecting constituents by confining the constituents in tubes is provided substantially, as shown in and/or described in connection with at least one of the figures, as set forth more completely in the claims.

An aspect of the present disclosure relates to an apparatus for injecting a plurality of constituents by confining the constituents in one or more tubes. The apparatus includes an outer tube; a global positioning satellite (GPS); a programmable logic controller (PLC); an Artificial intelligence (AI) robot; a computer; an encoder; a plurality of limit switches, and a spacer tube.

The outer tube includes a plurality of stackable tubes. The stackable tubes are stackable either in one or more cylinder segments or one or more polygonal shapes. The stackable tubes have diameters smaller than the diameter of a hollow shaft injection drill bit to enable lateral ejection. The constituents confined in the stackable tubes are ejected through a plurality of apertures for an injection purpose. The stackable tubes include a lid and a plurality of perforations. The stackable tubes enable prescriptive habitat and/or amendment elements at specific depths determined by the GPS location and the encoder or the plurality of limit switches communicating to the PLC, the AI robot, and the computer. The spacer tube holds a secondary tube for ejection or with or without matching perforations to the shaft hollow injection drill bit and spacer perforations. The AI robot through thermal imaging obtains the temperature of the ground to determine the quantity and/or a plurality of supportive habitat injection tubes and/or a plurality of heating tubes. The encoder revolutions per minute equal soil density by ternary scale (resistance) which can be measured by the resistance of revolutions per minute and be determinate of porosity constituents filling tube. The encoder determines the precision use targeted depth of any part of an auger assembly and the distance the auger assembly has traveled for the ejection of one of the tubes or filling of one of the tubes and subsequent ejection of tube contents. The limit switches determine depth, in some cases a maximum depth for the tubes for the ejection of one of the tubes or filling of one of the tubes and subsequent ejection of the tube contents. The tubes are ejected at or above the maximum drilling depth verified by either the encoder or the limit switch of the hollow shaft injection drill bit.

In an aspect, the stackable tubes act as spacers to reduce the internal dimension (ID) of the hollow shaft injection drill bit.

In an aspect, the stackable tubes comprising one or more fixtures to support a plurality of devices.

In an aspect, the stackable tubes comprising a plurality of detachable fixtures such as the Fresnel lens, wherein the Fresnel lens with the tube loaded with zeolites warm the roots in a freeze by adding water in the evening, wherein the zeolites are a battery for heat released by the water.

In an aspect, the apparatus includes an injection drilling bit that includes a bottom aperture that is closed via an inserted tube with an actuated tube aperture to enhance lateral ejection.

In an aspect, the bottom aperture of the injection drilling bit is closed via an inserted tube with an elastomer aperture to enhance lateral ejection.

In an aspect, the bottom aperture of the injection drilling bit is closed via the inserted tube with a solid dish-head to enhance lateral ejection.

In an aspect, the constituents are ejected vertically or laterally-through the one or more perforations present in the wall sub-surface of the tubes to enable constituent amendment or sequestration.

In an aspect, when the bottom apertures are closed to protect the constituents from soil or water penetration.

In an aspect, the stackable tubes are ejected with constituents partially sub-surface with the remaining length purposefully positioned above the surface.

In an aspect, the stackable tube ejection is directed by the GPS to control the X plane and Y plane injection coordinates.

In an aspect, the apparatus injects living organisms within one or more hatchery tubes to provide habitat support after placement.

In an aspect, the apparatus includes a mesh insert to enable larger perforations of the stackable tubes for filtering above the surface and subsurface of the root zone.

If the length of the tube is greater than the targeted depth of an ejected tube, part of the tube remains above the surface.

In an aspect, the tubes open or close lateral perforations with a different loaded internal tube or by rotating the same tube into open and closed positions.

In an aspect, the tube perforation patterns or lack thereof enable a plurality of hollow shaft injection drill bit arrays to not need re-tooling for specific hole injection of prescriptive amendments.

In an aspect, some of the tubes have a much smaller diameter than the hollow shaft injection drill bit, creating an annulus and enabling outside the circumference or perimeter the ejection placement of straw, nutshells, or other abrasive matter to mitigate smearing.

In an aspect, the tubes have larger holes than the hollow shaft injection drill bit, enabling the lateral ejection placement of straw, nutshells, or other abrasive matter to migrate through injection and mitigate smearing.

In an aspect, the tubes that are ejected may have beveled edges and spiked shapes or tines to mitigate smearing.

In an aspect, the tubes enable the closing of lateral zones by the tube insertion inside the hollow shaft injection drill bit with the tube that has a bottom aperture.

In an aspect, the tubes enable protection from bottom incursions of the soil into the hollow shaft injection drill bit by having an aperture that closes.

In an aspect, the tubes modify the volume of the hollow shaft injection drill bit enabling a smaller diameter and the subsequent volume of a constituent at targeted prescriptive levels and depths.

In an aspect, the tops of tubes may be unscrewed or hinged or pressure fitted so that they may be fitted with observation equipment such as radar, wave pulses, sonic devices, and image capture equipment such as cameras.

In an aspect, the tube socks with perforations are removed with spent or adsorbed soil constituents that have a monetary value.

In an aspect, the tube with an outer housing has multiple small tubes with caps and each section with caps and or hemispheres that can be ejected which enable loading to minimize and or eliminate damage to biologicals or other fragile amendments.

In an aspect, the tube is made of transparent material such as plastic and ejected into the soil with an enclosed removable or stationary lid for the top or bottom end-caps (dish-head) of the tube.

In an aspect, the perforated tubes or stackable tubes are ejected with a colony of live matter such as but not exhaustive examples of nematodes, bees, and earthworms in any stage of development, wherein the tube may be made from any material including biodegradable materials and also filled with habitat materials.

In an aspect, the perforated tubes are ejected with a Fresnel lens fixture and filled with zeolites, wherein the perforated tube is made from any thermally conductive material.

In an aspect, the tube lid or aperture is removable, for the harvesting or retrieval of partially or fully saturated or exhausted constituents and or replacement of constituents.

In an aspect, the cone-shaped lids are corrugated with ribs to further enable rainwater to shed away from the tube.

There is an ever-increasing army of discrete amendments being tried to enhance soil health and/or productivity at the surface or near-surface soil horizons, as well as some rudimentary soil health amendment which includes trenching, air pressure, and spiking of soils.

Accordingly, one advantage of the present invention is that it uses the tube to laterally inject material at specific depths.

Accordingly, one advantage of the present invention is that the bottom aperture of the injection drilling bit can be closed via an inserted tube with an actuated aperture to enhance lateral ejection.

Accordingly, one advantage of the present invention is that it does not need to re-tool equipment for specific hole injection of prescriptive amendments.

Accordingly, one advantage of the present invention is that it provides an ability to open or close lateral perforations with a different loaded internal tube by rotating the same tube into open and closed positions.

Accordingly, one advantage of the present invention is that it can contain a bottom aperture for dispensing by mechanical means or activated by physical pressure.

Accordingly, one advantage of the present invention is that the tube may have a smaller diameter than the hollow shaft of the injection drill bit, enabling the placement of straw, nutshells, or other abrasive matter to mitigate smearing.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. 1A illustrates a view of an exemplary injection tube with an elastomer bottom aperture circled and noted in 107A for a close-up in FIG. 1B, in accordance with at least one embodiment.

FIG. 1B illustrates a view of an exemplary injection tube with an elastomer bottom aperture circled for a close-up in FIG. 1A and noted as 107A, elastomer aperture is in the closed position, in accordance with at least one embodiment.

FIG. 2A illustrates a view of an exemplary injection bit with an open bottom vertical injection port and horizontal injection perforations, in accordance with at least one embodiment.

FIG. 2B illustrates a view of an exemplary injection tube to be inserted into the bit shown in FIG. 2A with an open bottom vertical injection port and horizontal injection perforations, in accordance with at least one embodiment.

FIG. 2C illustrates a view of an exemplary close-up of the injection tube shown as 2B called out as 209B to be inserted into the bit shown in FIG. 2A with an open bottom vertical injection port and horizontal injection perforations, in accordance with at least one embodiment.

FIG. 5A illustrates a view of an exemplary tube with lower half perforations with the close-up call out for FIG. 5B, in accordance with at least one embodiment.

FIG. 5B illustrates a view of an exemplary close-up of perforations in the tube with a non-perforated dish head, in accordance with at least one embodiment.

FIG. 10C illustrates an exploded view of an exemplary stack tube with one of the stack tubes above the exterior tube, in accordance with at least one embodiment.

FIG. 10D illustrates an exploded view of an exemplary series of six stacked interior tubes with removable caps and one exterior tube, in accordance with at least one embodiment.

DETAILED DESCRIPTION

Figure 1C:
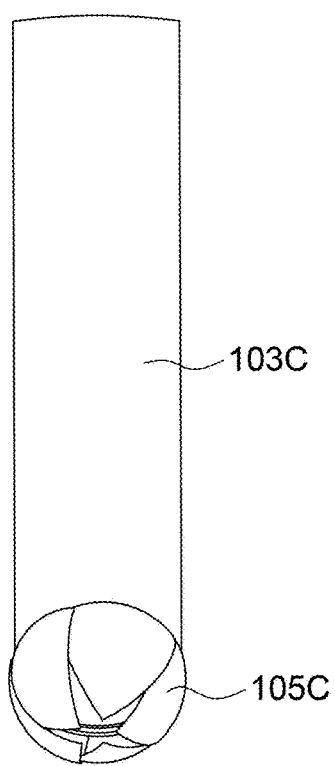
FIG. 1C illustrates a view of an exemplary injection tube with an elastomer aperture, which is in a partially opened position, in accordance with at least one embodiment.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The invention teaches an apparatus for injecting constituent sub-surface by confining them or enclosing them in one or more tubes.

According to a first embodiment of the present invention, it enables the closing of lateral zones by the Tube insertion inside a hollow shaft of a drilling auger or bit that has apertures and perforations.

According to a second embodiment of the present invention, it enables the material to flow laterally at specific depth locations.

According to a third embodiment of the present apparatus, it enables protection from bottom incursions of the soil into the hollow shaft of the drill bit by having an aperture.

According to a fourth embodiment of the present invention, it enables ejection of material out of the shaft through an actuated and or an elastomer aperture at the tube bottom.

According to a fifth embodiment of the present invention, it modifies the volume of the hollow shaft of the auger and injection drill bit.

According to a sixth embodiment of the present invention, it modifies volumes of material at specific depths that can be injected by the tube having different diameters and different positions or depths of the auger and injection drill bit hollow shaft.

According to a seventh embodiment of the present invention, it has different area sizes of perforations to control volumes that can be ejected by the tube out of the hollow shaft of the drill bit to flow laterally at specific depth locations.

According to an eighth embodiment of the present invention, it ejects a tube with or without a bottom or top enclosure. The tube may be clear, transparent, or neutral to infrared camera penetration. Tops of tubes may be unscrewed or hinged or pressure fitted so that they may be fitted with observation equipment such as radar, wave pulses, sonic devices, and image capture equipment such as cameras. In another embodiment of this objective, the present invention allows this tube with perforations and could be removed with amended constituents.

According to the ninth embodiment of the present invention, it enables targeted injection from a horizontal drilling operation as well as a vertical or angled vertical auger. In this case a horizontal drilling operation a specific depth with the perforations enabling lateral 360-degree penetration.

According to a tenth embodiment of the present invention, it enables targeted injection of time-released constituents. The Tube in this embodiment would be doubled walled (chamber or multi-chambered) and chambers could be filled with time-released and or non-time released materials for the benefit of sub-surface targets. The walls of the Tube could be rigid or semi-rigid and biodegradable as well and its degree of degradability acts as a secondary time release. In another embodiment, the perforations of the ejected Tube could be soluble to enable certain constituents to be released sooner.

According to an eleventh embodiment of the present invention, it is a collapsible flange whose Tube has an inner rim, to enable Tube ejection and minimize damage to Tube loaded constituents.

According to a twelfth embodiment of the present invention, it provides a paper or composite spiral tube in which the finished spiral tube can hold injection materials.

According to a thirteenth embodiment of the present invention, it provides a compartment tube in which as an example a section or sections of the annulus have walls, these walls of any polygonal shape can enable separated materials or help with the ejection of the constituents by another device.

According to a fourteenth embodiment of the present invention, the tube of the present invention includes cylindrical and/or any polygonal shape that may be inserted into a hollow stem or shaft.

According to a fifteenth embodiment of the present invention, it provides a tube that may have sealing rings, which could be located at the inlet and or one located at the outlet of the insert tube.

According to a sixteenth embodiment of the present invention, the tubes may be loaded with compressed gas and or steam via an aperture post sealing and enabling ejection of material or moving debris away from a bottom aperture.

According to a seventeenth embodiment of the present invention, it provides a tube that may be comprised of one or more sections that are screwed and or fastened together.

According to an eighteenth embodiment of the present invention, it provides a tube with a flange with or without holes for a catch to easily remove or load the tube.

According to a nineteenth embodiment of the present invention, it provides a tube flange that may also be made of material that would allow a device to push the Tube out of the hollow stem or shaft of the injection drilling bit.

According to a twentieth embodiment of the present invention, it provides a tube composed of two long sections with male and female overlapping lips, and each section with quartered caps and or hemispheres that can be ejected which enable loading to minimize and or eliminate damage of biologicals or other fragile amendments.

According to a twenty-first embodiment of the present invention, it provides a tube with a flange within the annulus of the tube creating a smaller internal dimension to the hollow shaft of the drill bit which enables ejection of the constituent material with or without the entire tube sub-surface ejection.

According to a twenty-second embodiment of the present invention, it provides a tube that may be made from but not limited to the following materials such as metal, alloys, plastic, composites, clays, biodegradable plastics, paper, or any combination thereof.

According to a twenty-third embodiment of the present invention, it provides a tube that may be made from a transparent material such as plastic and ejected into the soil with an enclosed removable or stationery lid for the top or bottom end-caps (dish-head) of the tube.

According to a twenty-fourth embodiment of the present invention, it provides a tube that can be ejected with a colony of live matter such as but not exhaustive examples of nematodes, bees, and earthworms in any stage of development. The tube may be made from any material including biodegradable materials.

According to a twenty-fifth embodiment of the present invention, it provides a tube that can be ejected with habitat for a colony of live matter such as but not exhaustive examples of nematodes, bees, and earthworms in any stage of development.

According to a twenty-sixth embodiment of the present invention, a bottom and or top sealed perforated tube can be ejected with habitat for a colony of live matter such as but not exhaustive examples of nematodes, bees, and earthworms at any stage of development.

According to a twenty-seventh embodiment of the present invention, it provides a tube within a tube that can be ejected and subsequently retrieved, with a heating element such as zeolites that are a heat battery to heat the sub-surface area of the root zone.

According to a twenty-eighth embodiment of the present invention, it provides a tube within a tube that can be ejected and subsequently retrieved made of materials such as Styrofoam with or without reinforcement strands made of materials such as polyethylene that can be ejected with a cooling device or amendment such as dry ice to cool the sub surface area of the root zone.

According to a twenty-ninth embodiment of the present invention, it provides a tube, which can be ejected whose external wall is impregnated with spiked abrasives to mitigate smearing and or biologicals, constituents, or other amendment materials.

According to a thirtieth embodiment of the present invention, it provides a tube that communicates with AI robotically, computer, PLC, and/or sensor for depth to eject or GPS coordinates for placement. The tube height may be keyed or communicated to the program to execute ejection upon depth being reached.

According to a thirty-first embodiment of the present invention, it increases the global inventory of aerable land with appropriate porosity Constituents prescriptive for its ternary type. Porosity modification is a function of the shape and size of solid Constituents such as but not by way of limitation, aggregates affecting the bulk mass density of the targeted Horizon. Likewise Living Constituents such as but not by way of limitation, aneic earthworms can improve Porosity by penetrating below Horizon A.

According to a thirty-second embodiment of the present invention, it provides a partial sub-surface ejection of the tube below the surface with a partial portion of the tube and or constituents above ground.

According to a thirty-third embodiment of the present invention, it provides a partial sub-surface ejection of the tube below the surface with a partial portion of the tube and constituents above ground in a configuration to create a circuitous path, maize and or linear barrier.

According to a thirty-fourth embodiment of the present invention, it provides a tube lid or aperture that is removable, for the harvesting or retrieval of partially or fully saturated or exhausted constituents and or replacement of constituents.

According to a thirty-fifth embodiment of the present invention, it provides inserts by way of illustration and does not limit a tube sock, netting, and or bag that is removable, for the harvesting of amended constituents and replacement of constituents.

Definitions

"Abrasives": means any Constituent capable of inhibiting smearing. By way of example but not limited Abrasives include walnut shells, pecan shells, and corn stover.

"Actuated": A device that causes a machine or other device to operate open or close and dispense a volume of material by way of example but not limit a gate or valve opening or closing.

"Actuated Aperture Closure": a device such as an Electromagnet that causes a Tube or other device to operate and close an aperture or open an aperture.

"Aerogel": an elastomer made of materials such as any combination of monomers or polymers filled with gas and vacated and subsequently vacated spaces that have a very low density compared to other elastomeric materials.

"Amendment Material": can also mean Constituents and or when used herein means any substance known to render a productivity advantage or benefit to sub-optimal soils and/or which provides any remediation benefit to such soils; and includes any biochar, compost, bacterial humus, and soil nutrients, fertilizers and fungi, particularly mycorrhizal fungi and mycorrhizal spores.

"Antimicrobial": is an agent that kills micro-organisms or stops their growth. Antimicrobials can be grouped according to the microorganisms they act primarily against. For example, antibiotics are used against bacteria, and antifungals are used against fungi.

"Aperture": An aperture is a hole or an opening through which can dispense or allow constituents to flow or stop flowing.

"Baits": Any agent that attracts a pest or unwanted organisms. By way of example and not meant to be limiting, Baits for insects are often food-based baits and are an effective and selective method of insect control. Typically, a bait consists of a base material called a carrier (often grain or animal protein) plus a toxicant (most often insecticides such as organophosphates, carbamates, or pyrethroids) and sometimes an additive (usually oil, sugar, or water) to increase attractiveness. The toxicant part of bait can also be biological rather than chemical. Examples of biological toxicants are *Bacillus thuringiensis* (Bt), parasitic nematodes, and fungi. Many baits are not highly attractive to the insect but instead function as an arrestant. Baits for rodents are generally cereal-based and made of grains such as oats, wheat, barley, corn, or a combination thereof. Formulations may also contain other ingredients such as adherents to bond the toxicant to the grain particles.

"Ball Screw": A high-efficiency feed screw with the ball making a rolling motion between the screw axis and the nut. Compared with a conventional sliding screw, this product has drive torque of one-third or less, making it most suitable for saving drive motor power.

"Carbon Brush": A small block of carbon used to convey current between the stationary and moving parts of an electro magnet, electric generator, motor, etc.

"Cartridge": A permanent or bio-degradable container so constructed as to allow it or its contents to be ejected from a Tube.

"Chemical": Means a compound or substance that has been purified or prepared, especially artificially for purposes of sub-surface amendments, such as but not limited to; fertilizers, sorption materials like zeolites, fungicides, herbicides, and insecticides. A chemical can mean any basic substance which is used in or produced by a reaction involving changes to atoms or molecules such as any liquid, solid, or gas.

"Cloud Computing": is a model for enabling ubiquitous, convenient, on-demand network access to a shared pool of configurable computing resources (e.g., networks, servers, storage, applications, and services) that can be rapidly provisioned and released with minimal management effort or service provider interaction.

"Coil": A length of something wound or arranged in a spiral or sequence of rings.

"Collar": An extension of a hollow shaft injection drill bit that can be solid, and may be known as an Injection Drill Bit Auger Extension. It may also be a protection device with or without perforations or windows. Collars may have teeth or burrs to push sub-surface material away from Windows and Apertures.

"Collar Perforations": May be in any shape or pattern by way of example but not limitation the shape of hexagons in the pattern of a honeycomb.

"Collar Window": A collar with a window opening.

"Colloids": are uniform mixtures that don't separate or settle out. While colloidal mixtures are generally considered to be homogeneous mixtures, they often display heterogeneous quality when viewed on the microscopic scale. There are two parts to every colloid mixture: the particles and the dispersing medium. The colloid particles are solids or liquids that are suspended in the medium. These particles are larger than molecules, distinguishing a colloid from a solution. However, the particles in a colloid are smaller than those found in a suspension. In smoke, for example, solid particles from combustion are suspended in a gas. Colloids include, Examples of colloids include by way of examples but are not limited the following fog, smoke, and foam.

"Compartment Tube": A tube capable of containing compartments and or stacking disc-like segments.

"Computer": An electronic device for storing and processing data, typically in binary form, according to instructions given to it in a variable program. May include by way of specificity an AI Robot.

"Cone": A solid or hollow object, which tapers from a circular or approximate circular base to a point.

"Cone Shaped Spillway": A spillway in the shape of a cone whose apex is at the center of the Hollow Shaft Injection Drilling Bit.

"Constituent": Any soil amendment material by way of example but not limitation abrasives, aggregate, amendments, minerals, lime, calcium, calcium carbonate, abrasives, antimicrobials, baits, bio-char, biologicals, bio-mass, carbon including activated, chemicals, colloids, compost, eco colonies, pre cursors to the eco colony, living organisms, inoculants, gas or any other material that can be injected sub surface to change the soil composition and or temperature. Constituents can mean chemical pesticides or natural biologicals for unwanted pests. Solid Constituents can be any polygonal shape, by way of example but are not limitation fines, granules, pellets, briquettes, blocks, or larger fragments that can fit inside and be ejected from a hollow shaft drill bit. Colloids regardless of phase state are considered as constituents. Constituents can contain doses of other constituents. Constituents also include Sorption or Sorbents materials.

"Copper Bands": The windings are flat copper strips to withstand the Lorentz force of the magnetic field. Electricity in the wire gets into the ring to make it into a magnet. A copper band includes any conductive material or alloy.

"Coupling, Gear Box Couplings, Gear Box Disc Coupling": Transmit torque from a driving to a driven bolt or shaft tangentially on a common bolt circle. Gear Box couplings are designed to transmit torque between two shafts that are not collinear. They typically consist of two flexible joints-one fixed to each shaft-which are connected by a spindle, or third shaft. A flange within the drawings below or at the top of a gearbox is Disc Couplings.

"Damping": Can refer to the equipment platform, where the substrate is materials by way of example but not limitation granite or plastics that have tensile strength for mounting but have properties to damp vibration and or torque.

"Density": Bulk density, also called apparent density or volumetric density, is a property of powders, granules, and other "divided" solids, especially used in reference to mineral components (soil, gravel), chemical substances.

"Dish Head": A hemispheric cap on a vessel or on a tube.

"Drill Bit" or "Drill Bit Tip": Any device capable of making a subsurface hole when connected to a power source with perforation holes or apertures, which may be any polygon with equal or unequal side lengths, and is manufactured from alloys, steel, titanium, manganese or other materials. The drill bit may contain industrial diamonds for sub-surface injection cavity creation.

"Eco Colony": Any subsurface space that is created by the injection of preferred constituents as established or precursor natural habitat for any specific desirable living organism.

"Eco Colony Pre Cursors": Injected subsurface Eco Colony habitat that is not populated by inhabitant colony.

"Elastomer": High molar mass material that when deformed at room temperature reverts quickly to nearly original size and form when the load causing the deformation has been removed (ISO 1382:1996). Within this patent, the word Elastomer can mean any Elastomeric material by itself or combined with concrete, aggregate solids, or carbon fiber. Elastomeric materials when referred to within this patent are interchangeable. Some materials that are Elastomer, but not limited to the following examples are Aerogel, Graphene Aerogel, Aerographer, Monomer, Polymers, Homopolymers, Copolymers, Rubber, Natural Rubber, Silicone, and Silicone Gel, Synthetic Rubber, Vulcanization, cross-linking, Thermoplastic Elastomer, and Rubber types.

"Electromagnet Coil": An electromagnetic coil is an electrical conductor by way of example but is not limitation a wire in the shape of a coil, spiral, or helix. It can be used to implement contactless position or proximity sensing. The field produced by the current in one coil induces a corresponding current in an adjacent coil, as in a power transformer. If, however, the second coil is mobile, the induced current is reduced as the distance increases.

"Electromagnetic Spring Aperture": An actuated opening.

"Electro-Magnetic Spring Injection Drill Bit Aperture Cap": An actuated opening at the end of a Hollow Shaft Injection Drilling Bit or Auger or Tube.

"Electromagnet Window Aperture": An actuated opening usually vertical.

"Electromagnet Wires": Negative and or Positive Wire.

"Extension Spring": An aperture spring that is composed of multiple springs to deploy the spring cap panel segment of an aperture closure.

"Encoders": Encoders are used in machinery for motion feedback and motion control. Encoders are found in machinery in all industries. Encoders (or binary encoders) are the combinational circuits that are used to change the applied input signal into a coded format at the output. These digital circuits come under the category of a medium-scale integrated circuits. In our case, they assist in-depth assessment and or achievement. Encoders through communication with PLC, Computer, or AI robotics and other interactive devices can trigger drilling platform ascent or descent or deployment and or retraction stacking of plunger. Depth achievement can trigger dispensing, plunger instructions, reamer wings, continued drilling or ascent, and then descent or repetition of these actions.

"Fastener Ring": A ring feature as part of the plunger panel that holds plunger panels in shut-stacked, deployed, or in the right position, and attached to the motor shaft.

"Feeder Auger": Examples of feeder augers that feed the materials to the drilling auger or its drilling inner tube, include augers with ribs, feeder flexible conveyor flight screws, flexible conveyor flight beveled round wire screws, flexible conveyor flight beveled square wire screws, flexible conveyor flight beveled wire screws, and flexible conveyor flight flat wire screws.

"Flange": Is a rim. Where a flange appears in a drawing associated with a hollow shaft injection drill bit can also mean a Gear Box Coupling and or Gear Box Disc Coupling. A flange can also be a chord and part of the internal diameter of the Tube. A projecting flat rim, collar, or rib on an object, serving to strengthen or attach. A flange is a rib or rim for strength, for guiding, or for attachment to another object.

"Flight Conduit Outer Tubes" or "Flight Tube" or "Conduit Tube": Within this space, a separate channel such as a smaller diameter or perimeter tube is incorporated into the side wall or an appendix to a conduit tube.

"Gear Box": The gearbox is a mechanical device used to increase the output torque or to change the speed (RPM) of a motor. The shaft of the motor is connected to one end of the gearbox and through the internal configuration of gears of a gearbox, provides a given output torque and speed determined by the gear ratio.

"GPS" "Global Positioning Satellite": An accurate worldwide navigational and surveying facility based on the reception of signals from an array of orbiting satellites.

"Ground Level": If something is at ground level, it is at the same level as the soil, rock, or water surface, as opposed to being higher up or below the surface.

"Hollow Shaft": Any injection auger and or drill bit space between the walls, space may be cylindrical or any polygonal shape.

"Hollow Shaft of Injection Drilling Auger": A cylinder, threaded cylinder, or corkscrew and has multiple parts: collar, bottom aperture, window aperture, spillway, perforations, wings, screw, spurs, cutting edges, twist, shank, and in some cases a tang.

"Hollow Shaft Injection Drilling Bit": Auger bits have adjustable blades with cutting edges and spurs that can be extended radially to cut large holes.

"Hollow Shaft Injection Drill Bit Screw Rib": Any rib on the side of the shaft of an auger drill bit or any drill bit.

"Homopolymer": means Polymer constructed of only one kind of monomer.

"Injection Drilling Bit": Either a bayonet, flat, impregnated head, screw, auger, fish tail, or any shape that can penetrate a sub-surface environment. Any hollow shaft device of any polygonal width or diameter that is capable of penetration of ice, soil, rock, and or mineral.

"Injection Drill Bit Auger Extension": A connection segment for devices used in sub-surface operations. Some examples are windows, apertures, and wings.

"Injection Drill Bit Screw": A tapered shape drilling bit or cylindrical shape with threads like a screw, with or without perforations.

"Inoculants": A constituent (a virus or toxin or immune serum) that is introduced into the sub-surface of the soil to produce or increase immunity to an undesirable living organism.

"Lead Screw": A threaded rod that drives the platform tool carriage in a drill or drilling array when subsurface drilling. Lead Screw can also be a Ball Screw, Worm Screw or Worm Gear.

"Limit Switch": a switch preventing the travel of an object in a mechanism past some predetermined point, mechanically operated by the motion of the object itself. Limit Switches are found in machinery in all industries. In this application assist in communicating depth achievement for ascent or descent communicating to PLC, Computer, or AI robotics and other interactive devices. Depth achievement can trigger dispensing, plunger instructions, reamer wings, continued drilling or ascent, and then descent or repetition of these actions. A Limit Switch can refer to a plurality.

"Living Organisms": An individual form of life, by way of example but not limitation bacterium, protist, fungus, plant, or animal, composed of a single cell or a complex of cells in which organelles or organs work together to carry out the various processes of life, including in some circumstances virus.

"Insulation": A material in which electric current does not flow freely.

"Magnetic Metals": Include ferromagnetic metals by way of example but not limit iron, nickel, cobalt, gadolinium, dysprosium, and alloys such as steel that also contain specific ferromagnetic metals by way of example but not limit iron or nickel.

"Minerals": A solid chemical compound with fairly well-defined chemical composition and a specific crystal structure that occurs naturally in pure form.

"Monomer": means Low molar mass molecules which can react with the same or a different kind of monomers, thus composing a polymer.

"Organic Matter": Organic matter, organic material, or natural organic matter refers to the large source of carbon-based compounds found within natural and engineered, terrestrial, and aquatic environments. It is matter composed of organic compounds that have come from the feces and remains of organisms such as plants and animals. In soils, dead matter makes up roughly 85% of the organic matter. Organic matter includes dead matter, living microbes, and living parts of plants (e.g., roots). Organic Matter includes the four basic types pure substance that cannot be broken down into other types of substances; lipid organic compound such as fat or oil; matter anything that takes up space and has mass; monosaccharide simple sugar such as glucose that is a building block of carbohydrates; nucleic acid organic compound such as DNA or RNA; nucleotide.

"Natural Rubber": means Cis-1,4-polyisoprene obtained from the latex of the rubber tree, most frequently from Hevea *Brasiliensis* plants.

"Negative Wire": If you have a wire where both sides are the same color, which is typically copper, the strand that has a grooved texture is the Negative Wire.

"Open Window": A window that is not closed by actuation of an aperture or without cover. Any window with a perforation pattern.

"Open Window Aperture": Is a polygon shape window that opens and closes via actuation.

"Perforation": Any polygonal shape that is a hole within a shaft, collar, guard, or tube. Perforations enable dispensing, injection and ejection of constituents both vertically and laterally.

"Platform": A ledge or shelf with damping.

"PLC": A programmable logic controller (PLC) is a small, modular solid-state computer with customized instructions for performing a particular task. PLCs, which are used in industrial control systems (ICS) for a wide variety of industries, have largely replaced mechanical relays, drum sequencers, and cam timers. PLCs are used for repeatable processes and have no mechanical parts and they can gather information from sensors. PLC can also mean a computer or remote Cloud computer.

"Polygon": a plane figure with at least three straight sides and angles, and typically five or more.

"Polymer": means Macromolecules constructed by the repetition of primary monomer units in such a way that the properties of the material do not change significantly due to the insertion or removal of some primary units.

"Porosity Soil or Soil Porosity": refers to the quantity of pores, or open space, between soil particles. Pore spaces may be formed due to the movement of roots, worms, and insects; expanding gases trapped within these spaces by groundwater; and/or the dissolution of the soil's parent material. Soil texture can also affect soil porosity. There are three main soil textures: sand, silt, and clay. Sand particles have diameters between 0.05 and 2.0 mm (visible to the naked eye) and are gritty to the touch. Silt is smooth and slippery to the touch when wet, and individual particles are between 0.002 and 0.05 mm in size. Clay is less than 0.002 mm in size and is sticky when wet. The differences in the size and shape of sand, silt, and clay influence the way the soil particles fit together, and thus their porosity.

"Positive Wire": The positive wire, also commonly called the hot wire, is usually black. It is the source of electricity.

"Process Methodology Diagram": An illustrative process step by step to show the function of an embodiment.

"Protrusion Jacket": Socket and or Cavity with walls that hold connections for wires, insulation to carbon brushes.

"Rib of Drill Bit": Any rib on the side of the shaft of an auger drill bit or any drill bit.

"Revolutions Per Minute or RPM": The speed of a motor.

"Root Zone": The root zone of plants is the area of soil and oxygen surrounding the roots of a plant. Roots are the starting point of a plant's vascular system. Water and nutrients are pulled up from the oxygenated soil around the roots, called the root zone, and pumped into all the aerial parts of the plant. Perennials and Trees also have root zones.

"Rhizome": The rhizome is a horizontal underground plant stem that sends out roots and shoots from nodes. In some plants, a rhizome is the only stem. In others, it is the main stem. Plants use rhizomes to store food and for vegetative propagation.

"Router": is a network hardware device equipped with a cellular hot spot that allows making communication between the internet and all devices which are linked to the internet in your house and office. The router has responsible to receives, analyzing, and forwarding all data packets from the modem and transferring it to the destination point.

"Rubber": means Cross-linked, vulcanized elastomer free of solvent which contracts to its 1.5 fold original length in one minute after the tension which has stretched the rubber to double length at room temperature has been released.

"Rubber type": means a group of rubber elastomers having the same kind of characteristics and enabling the same applications for products made of that group of elastomers.

"Rubber quality": means a vulcanized mixture of rubber satisfying a certain set of quality requirements.

"Satellite Dish": a bowl-shaped antenna with which signals are transmitted to or received from a communications satellite.

"Shaft of Injection Drilling Auger": Connection Section to other components of Drilling Auger or Drilling Auger Bit.

"Silicone and Silicone Gel": means a material that has shear characteristics of specially formulated silicone elastomers. These characteristics allow the energy absorption and return spring functions efficacy.

"Slip Ring or Slip Ring Bore Hole": a ring in a dynamo or electric motor which is attached to and rotates with the shaft, passing an electric current to a circuit via a fixed brush pressing against it. A Slip Ring with a hollow shaft creates a bore hole for an injection drill bit shaft.

"Sorption or Sorbents" Are Constituents capable of adsorbing/absorbing one or more constituents in gas, fluid, liquid, or a mixture thereof. Examples include activated carbon, atomic particles, bio-char, carbon materials, activated carbon, carbon nanotubes, catalysis, graphene, metal hydrides, nanoparticles, nano-structured materials, polymeric organic frameworks, silica, silica gel, clay, zeolites, other adsorbents/absorbents, or combination thereof. Useful adsorbents/absorbents, by way of example but not limitation carbon materials, have high surface areas and a high density of pores with optimal diameter. Sorption or Sorbents can be different types of activated charcoal and zeolites. Sorption or Sorbents may also be combinations that vary by type(s) of metal ions and/or organic material(s) used, and may be made in molecular clusters or molecular chains to obtain the desired quality, i.e. type of adsorption/absorption, and volume capacity in terms of the desired porosity. Examples of Sorption or Sorbents also include constituents by way of example but do not limit bio-char and zeolites.

"Spillway": A polygonal shape often likes a cone or other shape with an incline and or peak.

"Spiral Tube": Material rolled in the form of a spiral.

"Spring": An elastic or metal body or device that recovers its original shape when released after being distorted.

"Spring Aperture Cap Panel Segment": A composite of springs and aperture segments.

"Subsoil": is the layer of soil below the topsoil. The layer of soil closest to our feet is topsoil. Geologists refer to it as the "A" horizon, whereas subsoil is the "B" horizon. Topsoil is much more fertile than subsoil because it contains more organic matter, thus giving it a darker color. As per the soil profile, this is a kind of soil that lies below the surface soil but above the bedrocks. It is also called undersoil or B Horizon soil. It lies between C Horizon and E Horizon. The B Horizon predominantly consists of leached materials as well as minerals such as iron and aluminum compounds. Living Organisms aid Horizon A fertility but these organisms because of Porosity spend very little time below Horizon A.

"Suspended": Suspended is defined as suspension which is a heterogeneous mixture in which the solute particles do not dissolve but get suspended throughout the bulk of the medium. Emulsions are a type of suspension, where two immiscible liquids are mixed together. Any constituents that are liquid or particle held in suspension.

"Suspensions": An emulsion is a suspension of two liquids that usually do not mix together. These liquids that do not mix are said to be immiscible. An example would be oil and water.

"Synthetic Rubber": means Rubber, which has been produced by polymerizing one or more monomers.

"Thermoplastic Elastomer": Thermoplastic elastomers are in many respects a rubber-like material, which need not be vulcanized. The rubbery character disappears at the processing temperature but returns when the material has reached the operating temperature.

"Tube": A vessel and or an insert into a hollow shaft of any polygonal shape, that may have perforations, with or without a dish-head or flat bottom, with apertures that are open and or actuated. The tube may be made of materials by way of example but not a limitation and not exhaustive metal, alloys, elastomer, corrugated paper, paper, plastics, or composites. Tubes may be capable of being opened and vacuumed out and refilled. Tubes may contain netting to enable the removal of larger particulate. Tubes may be in the shape of a cork screw with a top interface for removal. Tubes may contain reactants to steam or other injected material. Tubes may have a quick-release feature. Tubes may contain wire prongs that can be manually or mechanically deployed. Tubes many have closure lids that are removable or can facilitate adding or removal of their contents. Tubes may have perforations. Tubes may have fasteners. Tubes may have fixtures that can be attached to facilitate other intellectual property. Tubes can be any length capable of insertion into a hollow drilling shaft. Multiple Tubes can be inserted into a hollow drilling shaft. Tubes may be ejected into the ground. Tubes may have inserts by way of example and are not limitation smaller Tubes, Tube Socks, and or Bags.

"Tube Collapsing": A Tube that may have telescoping ribs or a corrugated structure that enables the Tube to collapse. Enabling chambers within a hollow shaft to inject material via a Collapsing Tube which may be made of materials by way of example but not limitation metal, alloys, Elastomer, plastic, or composites.

"Tube Ejected or Tube of Ejectable Type": A vessel and or an insert into a hollow shaft of any polygonal shape, that may have perforations, whose top may maybe open, or open with a flange impending on the internal dimension of the Tube, or whose top may be sealed and or sealed and perforated, top may be in the shape of a cone to shed water, the top may be a removable lid, the top may be threaded, top may seal with pressure push with or without a flange. The Tube whose bottom can be with or without a dish-head or flat-bottom sealed and or sealed and perforated, Tube may be made of materials by way of example but not a limitation and not exhaustive the following biodegradable paper and or bamboo, plastics, clays, wood, cellulose, metal, alloys, elastomer, biodegradable plastic and or composites. A tube without a bottom mechanical aperture feature. The tube can be made of nutrients for the Living Organisms and or Soil.

"Tube within a Tube": An outer tube that can be a "Tube Ejected or Tube of Ejectable Type" that has smaller tubes that are stackable either in cylinder segments or other polygonal shapes. Stackable tubes may have lids and may have perforations. Stackable tubes enable prescriptive habitat and or amendment elements at specific depths.

"Vulcanization, cross-linking": means an irreversible process in which the rubber compound is transformed in a chemical reaction (e.g., cross-linking) into a three-dimensional network that preserves its elastic characteristics over a wide temperature range. The term vulcanization relates to the use of Sulphur and its derivatives, whereas the term cross-linking is usually connected with Sulphur-free processes.

"Window": A polygonal shape by way of example but not limitation a rectangle that enables the flow of constituents from the Shaft of Injection Drilling Auger sub surface.

"Window Vertical Aperture": A side shaft window rather than a bottom window of the Shaft of the Injection Drilling Auger.

"Worm Screw and Worm Gear": Used to transmit motion and power when a high-ratio speed reduction is required. Worm Screws and Worm Gears accommodate a wide range of speed ratios.

"Zeolites": Any of various hydrous silicates that are analogous in composition to the feldspars, occur as secondary minerals in cavities of lavas, and can act as ion-exchangers. Any of various natural or synthesized silicates of similar structure are used especially in water softening and as adsorbents and catalysts. Zeolites offer the capability of salinity and boron remediation. Clinoptilolite (a naturally occurring zeolite) is used as a soil treatment in agriculture. It is a source of potassium that is released slowly. They can adsorb effluent and ammonia, and subsequently be used as soil nutrients.

FIG. 1A illustrates a view of an exemplary injection tube with an elastomer bottom aperture circled and noted in 107A for a close-up in FIG. 1B, in accordance with at least one embodiment. FIG. 1A depicts a flange 103A, a non-perforated tube 105A, and an elastomer segmented cap 107A.

FIG. 1B illustrates a view of an exemplary injection tube with an elastomer bottom aperture circled for a close-up in FIG. 1A and noted as 107A, elastomer aperture is in the closed position, in accordance with at least one embodiment. FIG. 1B depicts a tube stem 103B, and a fully closed elastomer segmented cap 105B.

FIG. 1C illustrates a view of an exemplary injection tube with an elastomer aperture, which is in a partially opened position, in accordance with at least one embodiment. FIG. 1C depicts a tube stem 103C, and a partially open elastomer segmented cap 105C.

Figure 1D:
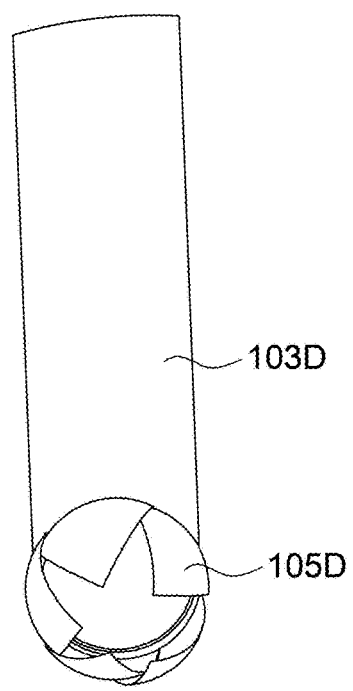
FIG. 1D illustrates a view of an injection tube with an elastomer aperture, is in a fully opened position, in accordance with at least one embodiment.

FIG. 1D illustrates a view of an injection tube with an elastomer aperture, is in a fully opened position, in accordance with at least one embodiment. FIG. 1D depicts a tube stem 103D, and a fully open elastomer segmented cap 105D.

FIG. 2A illustrates a view of an exemplary injection bit with an open bottom vertical injection port and horizontal injection perforations, in accordance with at least one embodiment. FIG. 2A depicts a hollow perforated stem injection drill bit flange 203A, a hollow non-perforated segment of injection drill bit stem 205A, perforations 207A, and an injection drill bit screw rib 209A.

FIG. 2B illustrates a view of an exemplary injection tube to be inserted into the bit shown in FIG. 2A with an open bottom vertical injection port and horizontal injection perforations, in accordance with at least one embodiment. FIG. 2B depicts a tube flange 203B, a non-perforated portion of injection drill bit tube 205B, perforations 207B, and hollow bottom 209B.

FIG. 2C illustrates a view of an exemplary close-up of the injection tube shown as 2B called out as 209B to be inserted into the bit shown in FIG. 2A with an open bottom vertical injection port and horizontal injection perforations, in accordance with at least one embodiment. FIG. 2C depicts a tube stem or shaft 203C, a tube perforation 205C, and a hollow bottom tube 207C.

Figure 3A:
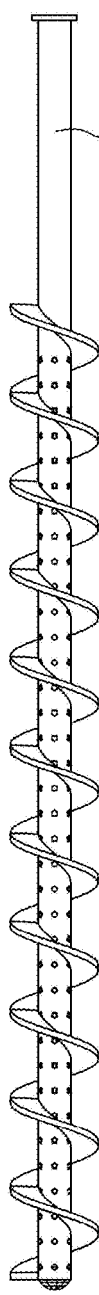
FIG. 3A illustrates a view of an exemplary drill bit with a vertical electromagnetic spring bottom and inserted tube with an electromagnet spring bottom aperture, in accordance with at least one embodiment.

FIG. 3A illustrates a view of an exemplary drill bit with a vertical electromagnetic spring bottom and inserted tube with an electromagnet spring bottom aperture, in accordance with at least one embodiment. FIG. 3A depicts injection drill bit with perforations 303A.

Figure 3B:
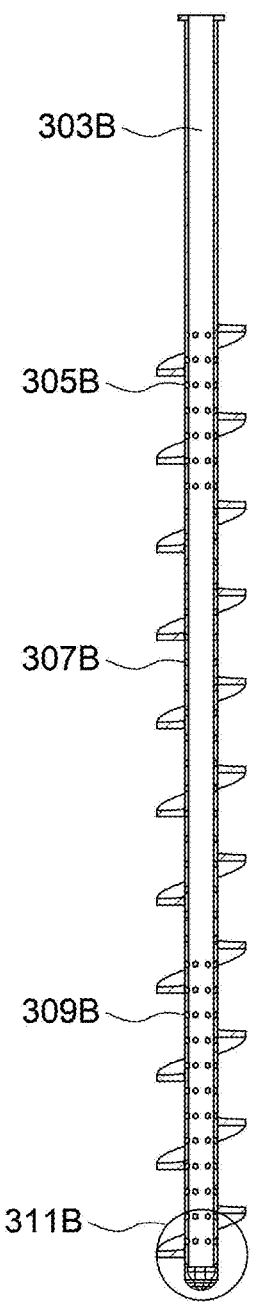
FIG. 3B illustrates a view of an exemplary drill bit non inserted tube with an electromagnet spring bottom aperture called out in 311B, this exemplar also shows strata horizontal injection perforation areas, in accordance with at least one embodiment.

FIG. 3B illustrates a view of an exemplary drill bit non inserted tube with an electromagnet spring bottom aperture called out in 311B, this exemplar also shows strata horizontal injection perforation areas, in accordance with at least one embodiment. FIG. 3B depicts an injection drill bit cross-section of injection drill bit tube 303B, strata specific perforations 305B, no perforations hollow stem 307B, lower strata specific perforations 309B, and electromagnetic spring injection drill bit tube cap 311B.

Figure 3C:
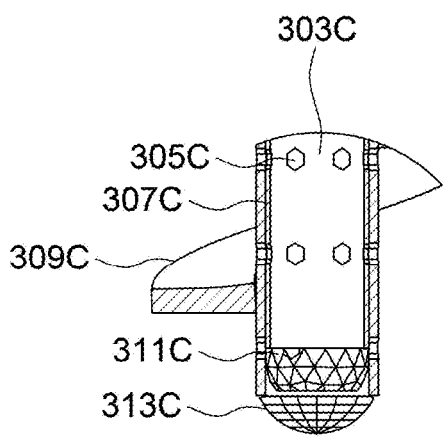
FIG. 3C illustrates a view of an exemplary cross-section of the drill bit with a vertical electromagnetic spring bottom and inserted tube with an electromagnet spring bottom aperture called out in FIG. 3B and noted in 311B, in accordance with at least one embodiment.

FIG. 3C illustrates a view of an exemplary cross-section of the drill bit with a vertical electromagnetic spring bottom and inserted tube with an electromagnet spring bottom aperture called out in FIG. 3B and noted in 311B, in accordance with at least one embodiment. FIG. 3C depicts a hollow stem wall 303C, perforations 305C, electrical wires 307C, injection drill bit auger screw 309C, electromagnetic spring injection drill bit tube cap 311C, and electromagnetic spring injection drill bit cap 313C.

Figure 4A:
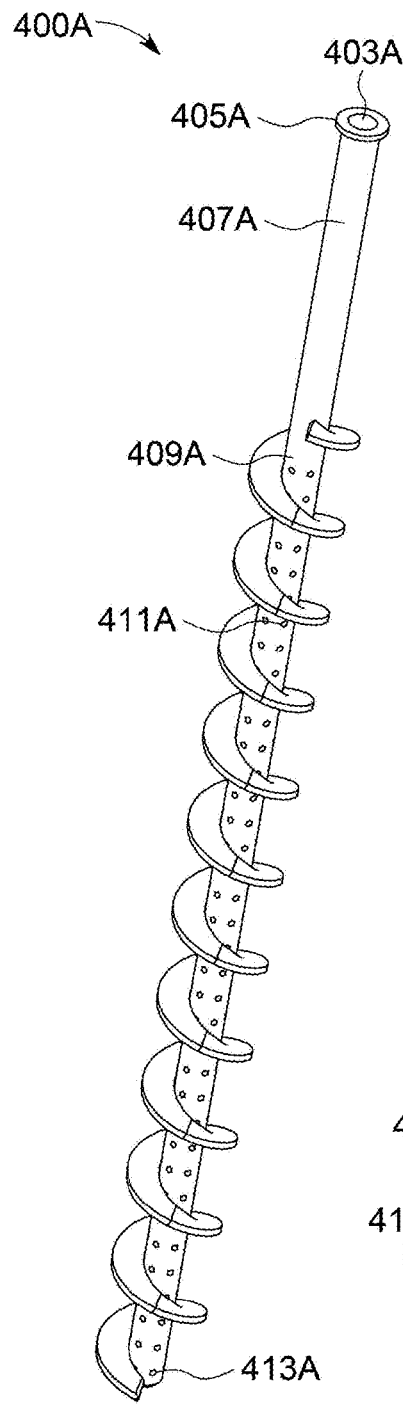
FIG. 4A illustrates a view of an exemplary injection drill bit without a bottom cap, in accordance with at least one embodiment.

FIG. 4A illustrates a view of an exemplary injection drill bit without a bottom cap, in accordance with at least one embodiment. FIG. 4A depicts a hollow stem of injection drill bit 403A, a flange 405A, no perforations on a hollow stem of injection drill bit 407A, an injection drill bit screw rib 409A, injection drill bit perforations 411A, and injection drill bit hollow open bottom 413A.

Figure 4B:
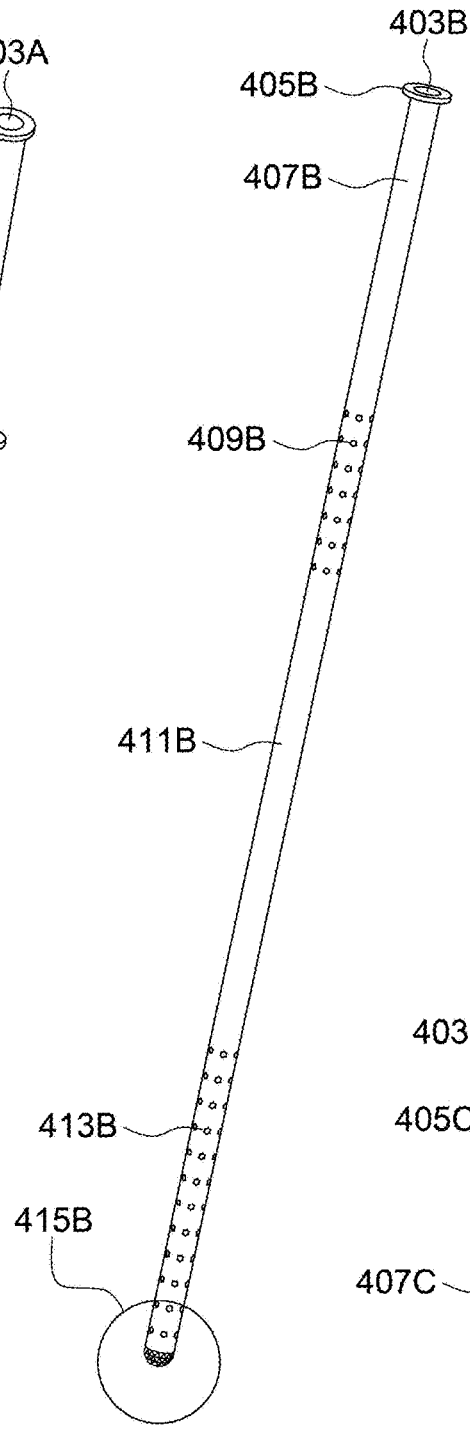
FIG. 4B illustrates a view of an exemplary drill bit non inserted tube with an electromagnet spring bottom called out in 305B, this exemplar also shows strata horizontal injection perforation areas, in accordance with at least one embodiment.

FIG. 4B illustrates a view of an exemplary drill bit non inserted tube with an electromagnet spring bottom called out in 305B, this exemplar also shows strata horizontal injection perforation areas, in accordance with at least one embodiment. FIG. 4B depicts an injection drill bit tube hollow entry 403B, flange 405B, no perforations 407B, strata perforations 409B, no perforations 411B, a lower strata perforations 413B, and electromagnetic spring tube cap 415B.

Figure 4C:
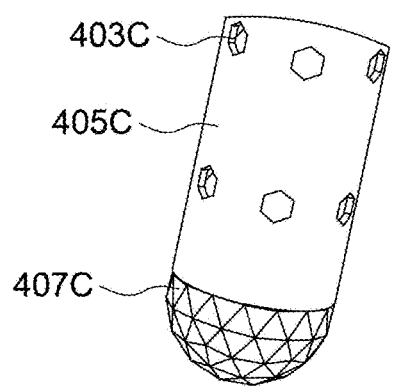
FIG. 4C illustrates a view of an exemplary close-up view of an exemplary drill bit non inserted tube with an electromagnet spring bottom fully formed called out in FIG. 4B and detailed in 415B, this exemplar also shows strata horizontal injection perforation areas, in accordance with at least one embodiment.

FIG. 4C illustrates a view of an exemplary close-up view of an exemplary drill bit non inserted tube with an electromagnet spring bottom fully formed called out in FIG. 4B and detailed in 415B, this exemplar also shows strata horizontal injection perforation areas, in accordance with at least one embodiment. FIG. 4C depicts a close-up of FIGS. 4B and 415B show polygon lower strata perforation shape 403C, no perforations in tube 405C, and a close-up of FIGS. 4B and 415B show electromagnetic spring tube aperture 407C.

FIG. 5A illustrates a view of an exemplary tube with lower half perforations with the close-up call out for FIG. 5B, in accordance with at least one embodiment. FIG. 5A depicts a tube flange 503A, a non-perforated tube shaft 505A, and a perforated tube shaft 509A call out for FIG. 5B (507A).

FIG. 5B illustrates a view of an exemplary close-up of perforations in the tube with a non-perforated dish head, in accordance with at least one embodiment. FIG. 5B depicts a non-perforated tube shaft 503B, a perforated tube shaft 505B, and a non-perforated dish head 507B.

Figure 6A:
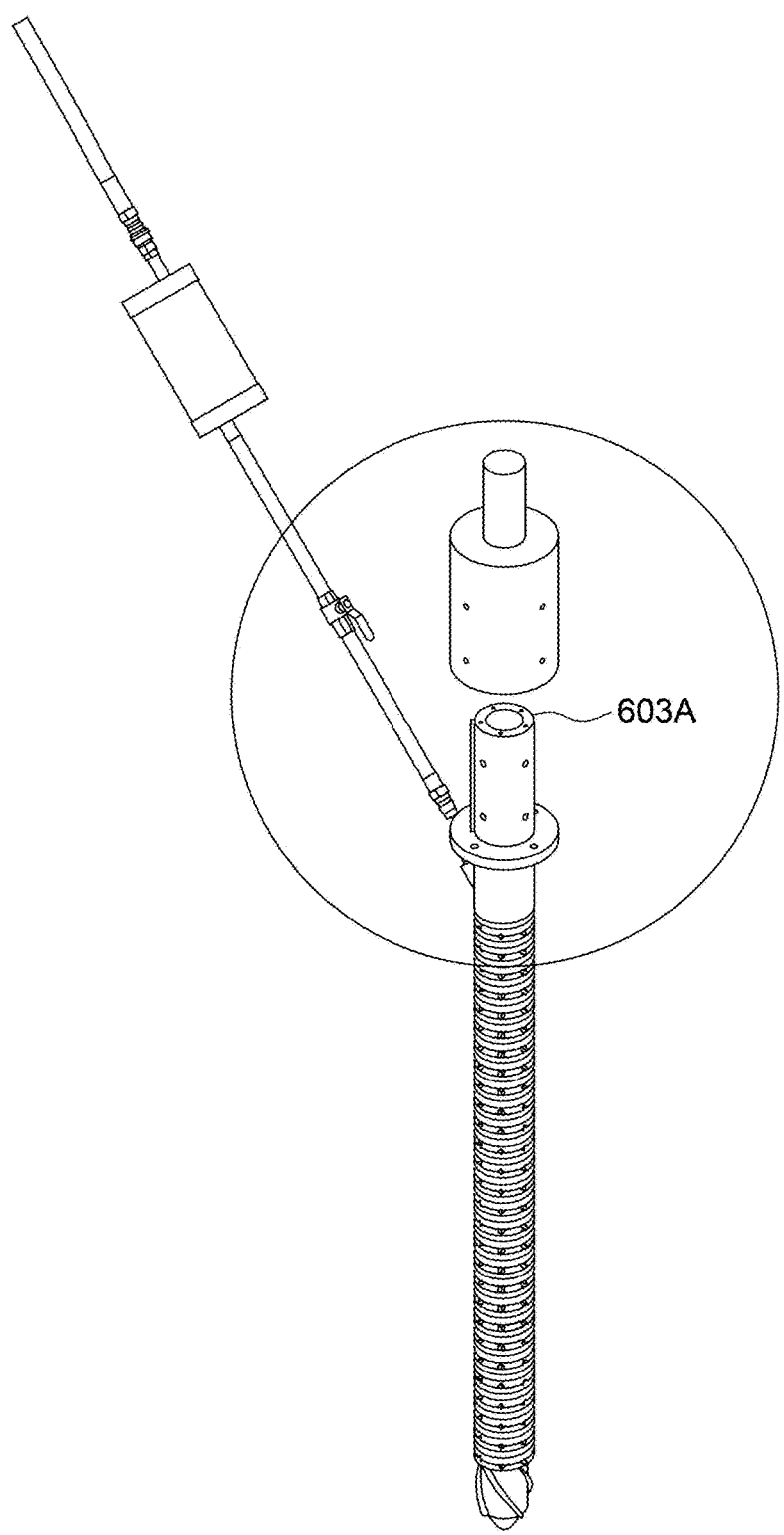
FIG. 6A illustrates a view of an exemplary fully inserted tube into a perforated injection drill auger, in accordance with at least one embodiment.

FIG. 6A illustrates a view of an exemplary fully inserted tube into a perforated injection drill auger, in accordance with at least one embodiment. FIG. 6A depicts a fully inserted tube 603A.

Figure 6B:
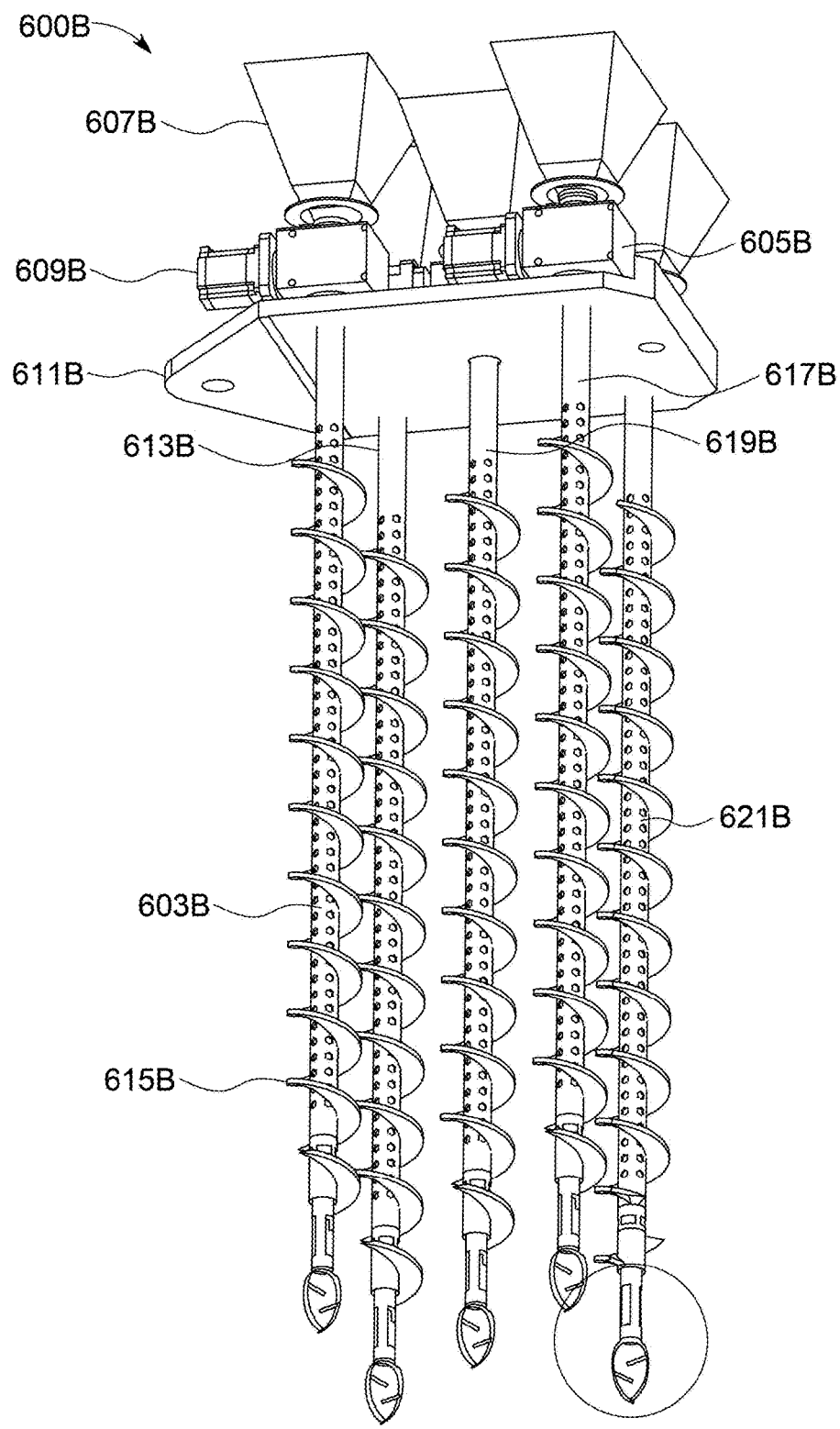
FIG. 6B illustrates a view of an exemplary plurality and or an array of hollow shaft injection drill bits, in accordance with at least one embodiment.

FIG. 6B illustrates a view of an exemplary plurality and or an array of hollow shaft injection drill bits, in accordance with at least one embodiment. FIG. 6B depicts perforations in hollow shaft injection drill bit 603B, a gearbox 605B, a hopper 607B, a motor 609B, a platform 611B, a hollow shaft injection drill bit 613B, a hollow shaft injection drill bit 615B, hollow shaft injection drill bit 617B, a hollow shaft injection drill bit 619B, hollow shaft injection drill bit 621B.

Figure 7A:
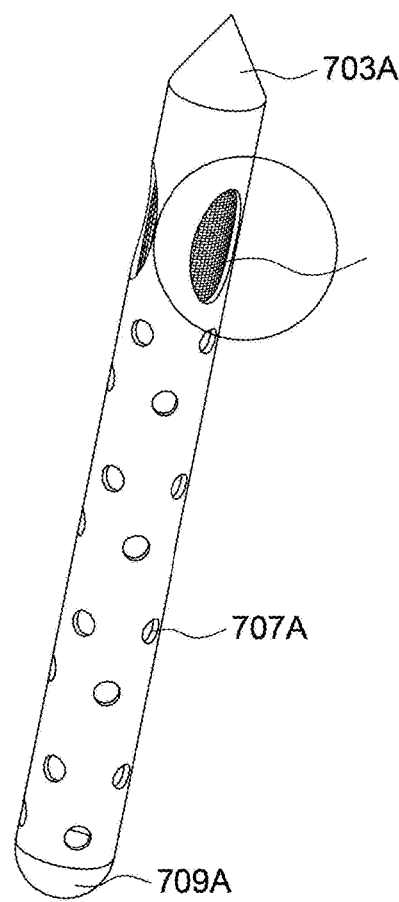
FIG. 7A illustrates a view of an exemplary tube with a non-perforated metal cone threaded lid and or cap that is affixed to a tube that houses a mesh sock with multiple shapes and size perforations whose bottom cap is not perforated, in accordance with at least one embodiment.

FIG. 7A illustrates a view of an exemplary tube with a non-perforated metal cone threaded lid and or cap that is affixed to a tube that houses a mesh sock with multiple shapes and size perforations whose bottom cap is not perforated, in accordance with at least one embodiment. FIG. 7A depicts a cone cap or lid 703A, a perforation exposing mesh sock 705A, a perforation within the shaft of tube 707A, and a dish cap or lid 709A.

Figure 7B:
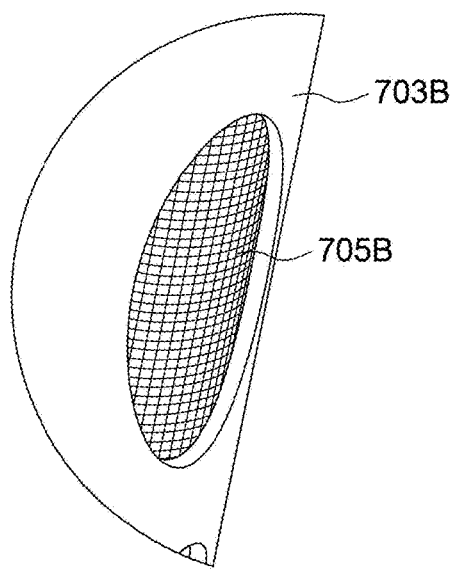
FIG. 7B illustrates a close-up view of an exemplary a tube that houses a mesh sock, in accordance with at least one embodiment.

FIG. 7B illustrates a close-up view of an exemplary a tube that houses a mesh sock, in accordance with at least one embodiment. FIG. 7B depicts a tube 703B, and a perforation exposing mesh sock 705B.

Figure 7C:
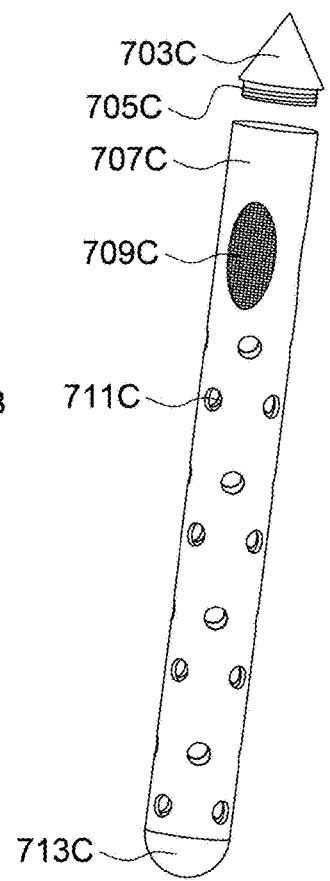
FIG. 7C illustrates an exploded view of an exemplary tube with a non-perforated metal cone threaded lid and or cap that is affixed to a tube that houses a mesh sock with multiple shapes and size perforations whose bottom cap is not perforated, in accordance with at least one embodiment.

FIG. 7C illustrates an exploded view of an exemplary tube with a non-perforated metal cone threaded lid and or cap that is affixed to a tube that houses a mesh sock with multiple shapes and size perforations whose bottom cap is not perforated, in accordance with at least one embodiment. FIG. 7C depicts a cone cap or lid 703C, a cone cap or lid threads 705C, a tube body or shaft 707C, a perforation exposing mesh sock 709C, and perforation within the shaft of tube 711C, and dish cap or lid 713C.

Figure 7D:
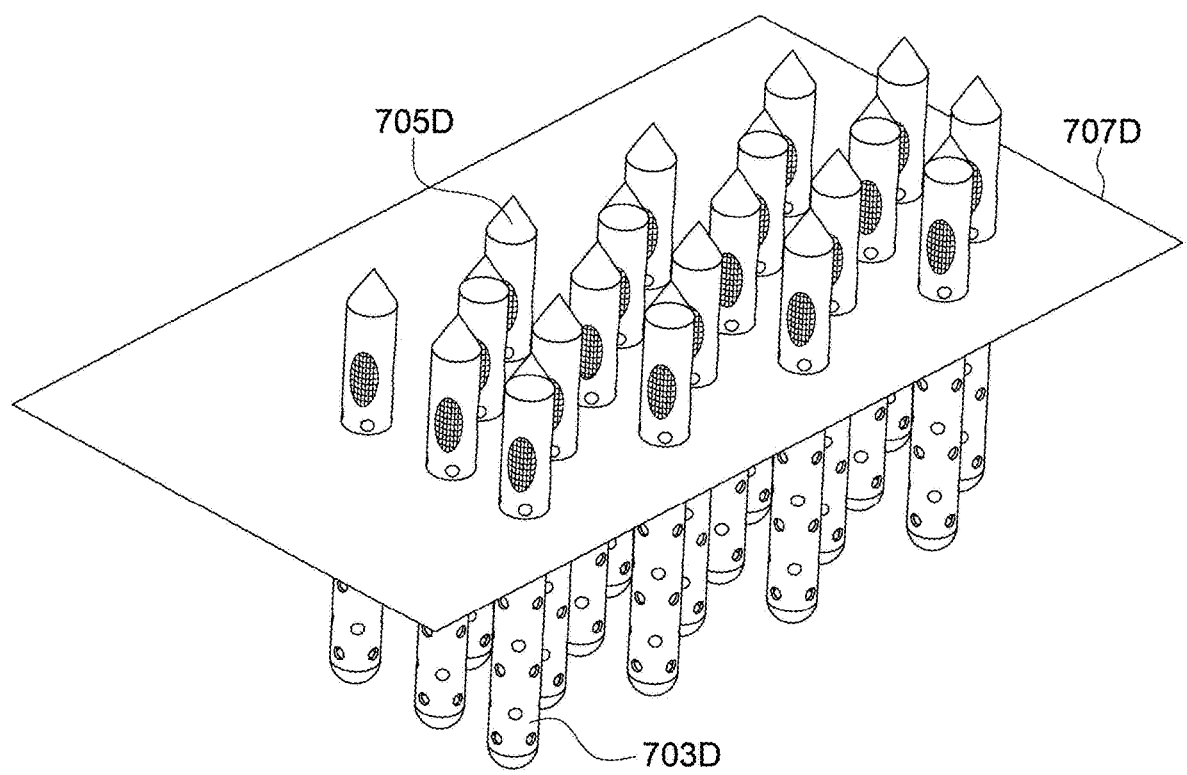
FIG. 7D illustrates a view of an exemplary array of FIG. 7A where a portion of the tubes is not subsurface, in accordance with at least one embodiment.

FIG. 7D illustrates a view of an exemplary array of FIG. 7A where a portion of the tubes is not subsurface, in accordance with at least one embodiment. FIG. 7D depicts a tube body or shaft sub-surface 703D, a cone cap or lid 705D, and ground 707D.

Figures 8A, 8B:
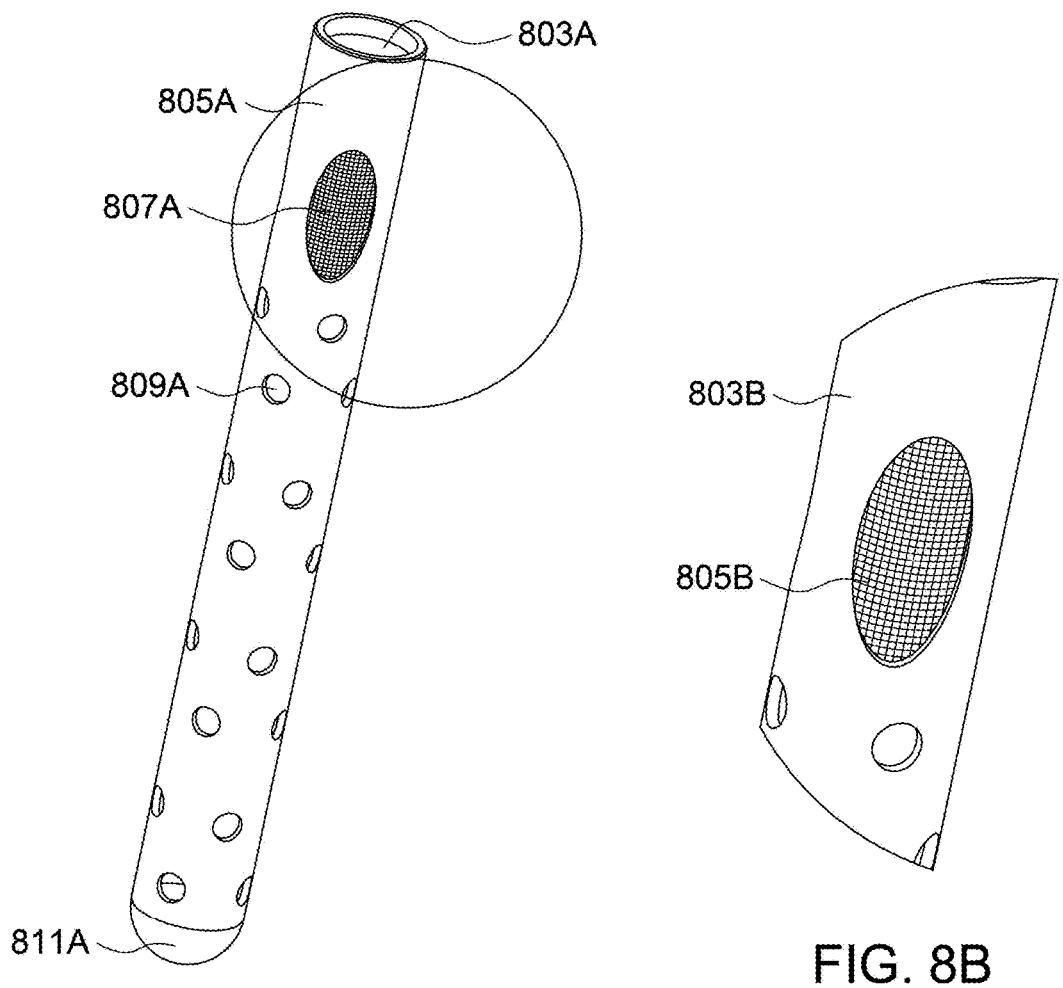
FIG. 8A illustrates a view of an exemplary tube with a non-perforated metal flat non-threaded lid and or cap that is affixed to a tube that houses a mesh sock with multiple shapes and size perforations whose bottom cap is not perforated, in accordance with at least one embodiment.
FIG. 8B illustrates a close-up view of an exemplary a tube that houses a mesh sock, in accordance with at least one embodiment.

FIG. 8A illustrates a view of an exemplary tube with a non-perforated metal flat non-threaded lid and or cap that is affixed to a tube that houses a mesh sock with multiple shapes and size perforations whose bottom cap is not perforated, in accordance with at least one embodiment. FIG. 8A depicts a cap or lid 803A, a tube body or shaft 805A, a perforation exposing mesh sock 807A, a perforation within the shaft of tube 809A, and a dish cap or lid 811A.

FIG. 8B illustrates a close-up view of an exemplary a tube that houses a mesh sock, in accordance with at least one embodiment. FIG. 8B depicts a tube 803B, and a close-up of perforation exposing mesh sock 805B.

Figures 8C, 8D:
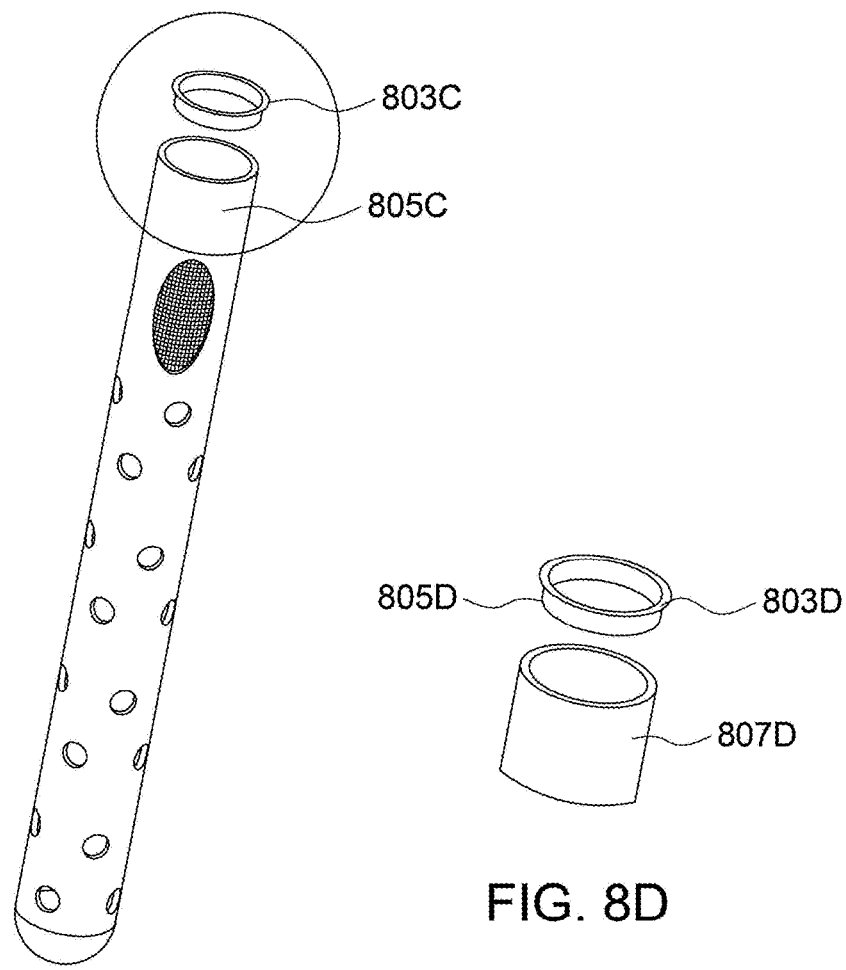
FIG. 8C illustrates an exploded view of an exemplary FIG. 8A where the lid and or cap are not attached, in accordance with at least one embodiment.
FIG. 8D illustrates a close-up view of an exemplary 803C and 805C tube with the lid and/or cap shown not attached, in accordance with at least one embodiment.

FIG. 8C illustrates an exploded view of an exemplary FIG. 8A where the lid and or cap are not attached, in accordance with at least one embodiment. FIG. 8C depicts a cap or lid 803C, and a tube body or shaft 805C.

FIG. 8D illustrates a close-up view of an exemplary 803C and 805C tube with the lid and/or cap shown not attached, in accordance with at least one embodiment. FIG. 8D depicts a flat lid or cap flange 803D, an interior circumferential lid rim affixed to flange 805D, and a tube body or shaft 807D.

Figure 9A:
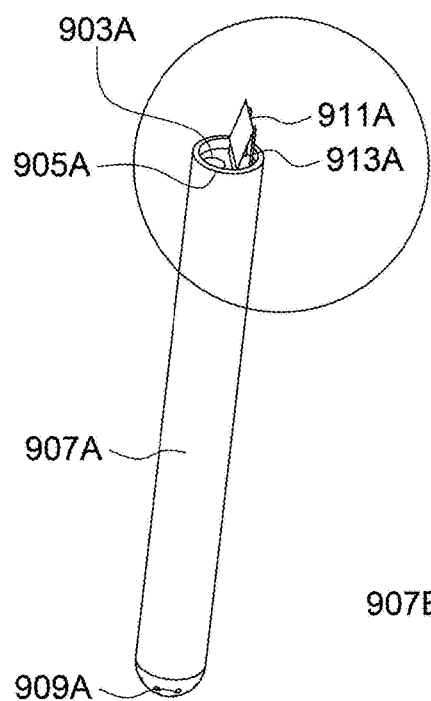
FIG. 9A illustrates a view of an exemplary tube with a fixture a Fresnel lens and a constituent feeding spout, in accordance with at least one embodiment.

FIG. 9A illustrates a view of an exemplary tube with a fixture a Fresnel lens and a constituent feeding spout, in accordance with at least one embodiment. FIG. 9A depicts a constituent spout 903A, a lid or cap flange 905A, a tube or shaft 907A, a perforated cap 909A, a Fresnel lens 911A, and a support structure for 911A (913A).

Figure 9B:
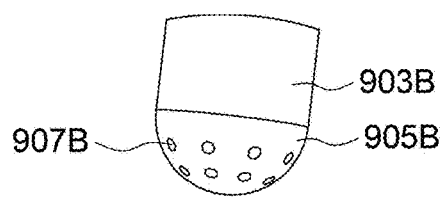
FIG. 9B illustrates a view of an example is a close-up of FIG. 9A 909A perforations on bottom tube cap, in accordance with at least one embodiment.

FIG. 9B illustrates a view of an example is a close-up of FIG. 9A 909A perforations on bottom tube cap, in accordance with at least one embodiment. FIG. 9B depicts a tube or shaft 903B, a cap 905B, and perforations 907B.

Figure 9C:
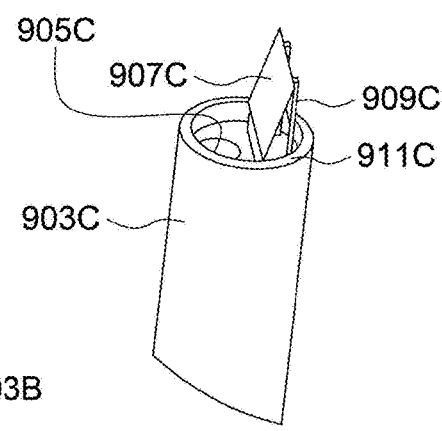
FIG. 9C illustrates a view of an exemplary close-up of FIG. 9A showing Fresnel fixture and constituent feeding spout, in accordance with at least one embodiment.

FIG. 9C illustrates a view of an exemplary close-up of FIG. 9A showing Fresnel fixture and constituent feeding spout, in accordance with at least one embodiment. FIG. 9C depicts a tube or shaft 903C, a constituent spout 905C, a Fresnel lens 907C, a support structure for 907C (909C), and a lid or cap flange 911C.

Figures 10A, 10B:
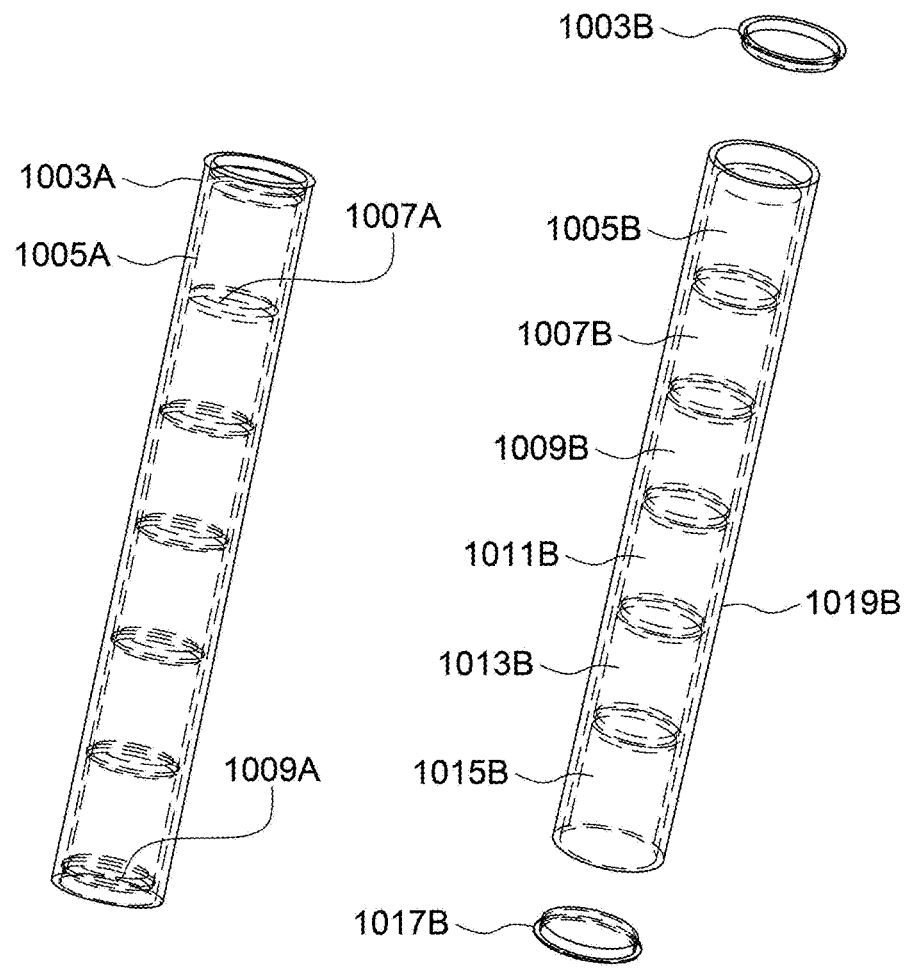
FIG. 10A illustrates a view of an exemplary transparent stacked tube within a tube, in accordance with at least one embodiment.
FIG. 10B illustrates an exploded view of an exemplary transparent stacked tube within a tube with caps, in accordance with at least one embodiment.

FIG. 10A illustrates a view of an exemplary transparent stacked tube within a tube, in accordance with at least one embodiment. FIG. 10A depicts a transparent lid 1003A, a stackable transparent tube 1005A, a transparent lid 1007A, and a transparent lid 1009A.

FIG. 10B illustrates an exploded view of an exemplary transparent stacked tube within a tube with caps, in accordance with at least one embodiment. FIG. 10B depicts a transparent lid 1003B, a stackable transparent tube 1005B, a stackable transparent tube 1007B, a stackable transparent tube 1009B, a stackable transparent tube 1011B, a stackable transparent tube 1013B, a stackable transparent tube 1015B, a transparent lid 1017B, and outer tube housing for stackable transparent tubes 1019B.

FIG. 10C illustrates an exploded view of an exemplary stack tube with one of the stack tubes above the exterior tube, in accordance with at least one embodiment. FIG. 10C depicts a lid 1003C, a stackable tube 1005C, and an outer tube housing for stackable tubes 1007C.

FIG. 10D illustrates an exploded view of an exemplary series of six stacked interior tubes with removable caps and one exterior tube, in accordance with at least one embodiment. FIG. 10D depicts a lid 1003D, a stackable tube 1005D, a stackable tube 1007D, a stackable tube 1009D, a stackable tube 1011D, a stackable tube 1013D, and an outer tube housing for stackable tubes 1015D.

Figure 11A:
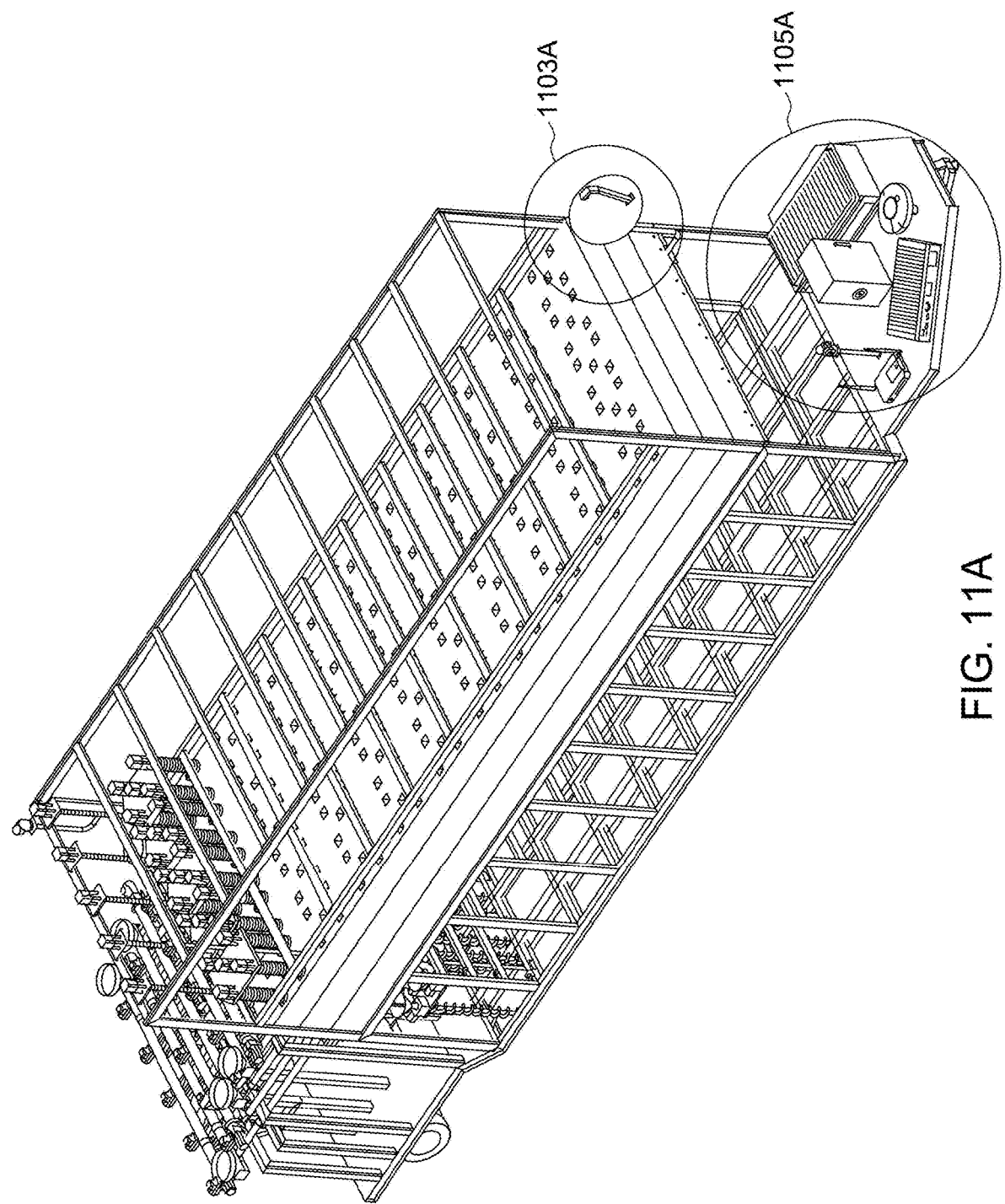
FIG. 11A illustrates a view of an exemplary communications platform of an injection drilling trailer with components seen in FIG. 11B and FIG. 11C, in accordance with at least one embodiment.
Figure 11C:
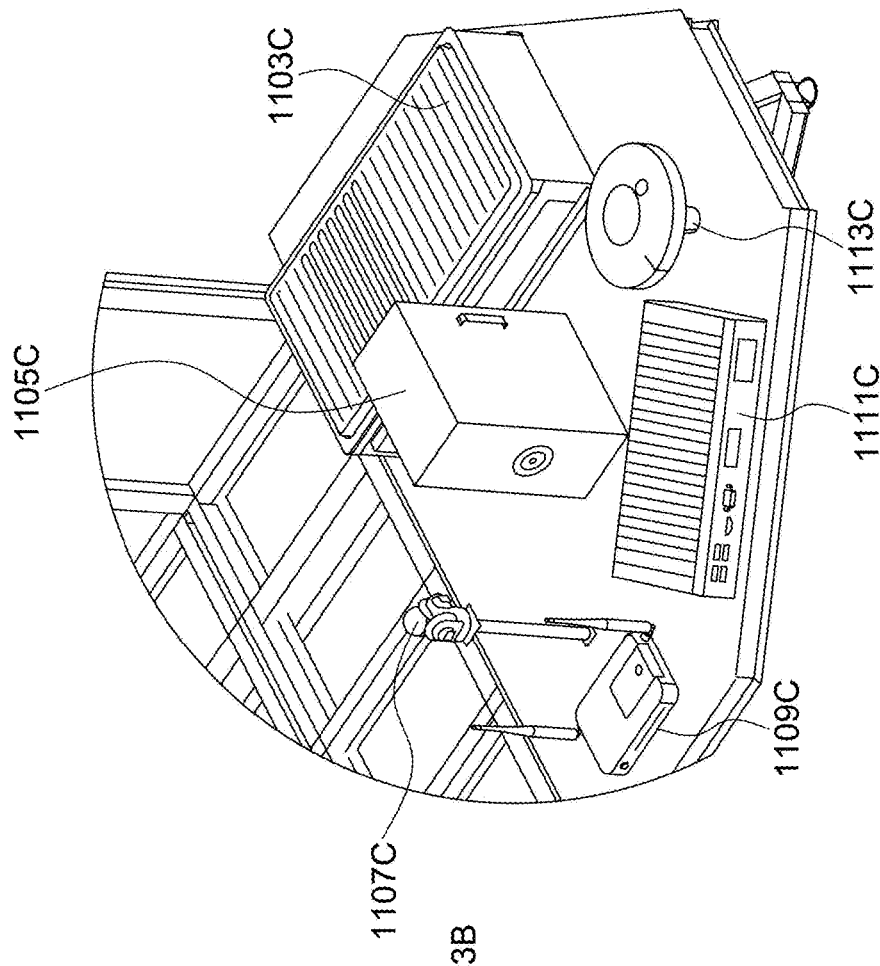
FIG. 11C illustrates a view of an exemplary close-up of components within the circle of FIGS. 11A and 1105A, in accordance with at least one embodiment.
Figure 11B:
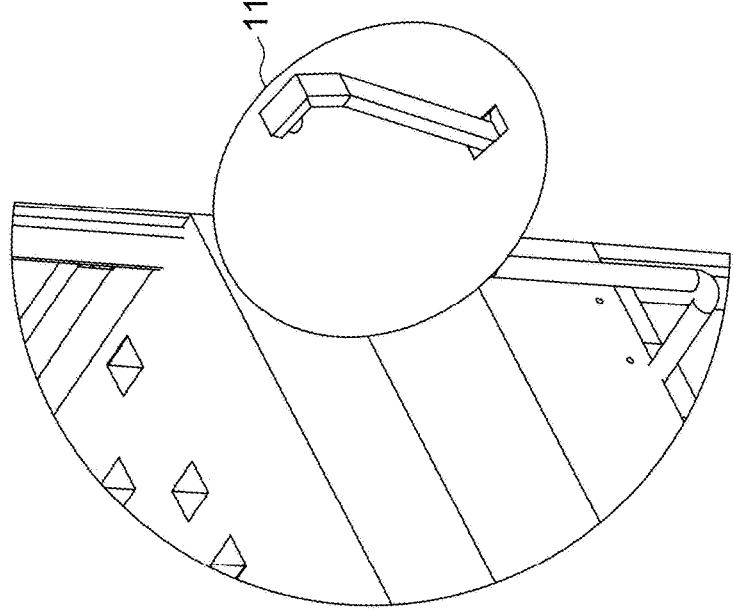
FIG. 11B illustrates a view of an exemplary satellite communications dish, in accordance with at least one embodiment.

FIG. 11A illustrates a view of an exemplary communications platform of an injection drilling trailer with components seen in FIG. 11B and FIG. 11C, in accordance with at least one embodiment. FIG. 11A depicts a satellite communications dish 1103A, and a communications platform containing components seen in FIG. 11C (1105A).

FIG. 11B illustrates a view of an exemplary satellite communications dish, in accordance with at least one embodiment. FIG. 11B depicts a satellite communications dish 1103B.

FIG. 11C illustrates a view of an exemplary close-up of components within the circle of FIGS. 11A and 1105A, in accordance with at least one embodiment. FIG. 11C depicts a fuel cell 1103C, PLC 1105C, AI robot 1107C, router 1109C, computer 1111C, and a GPS 1113C.

Figure 12:
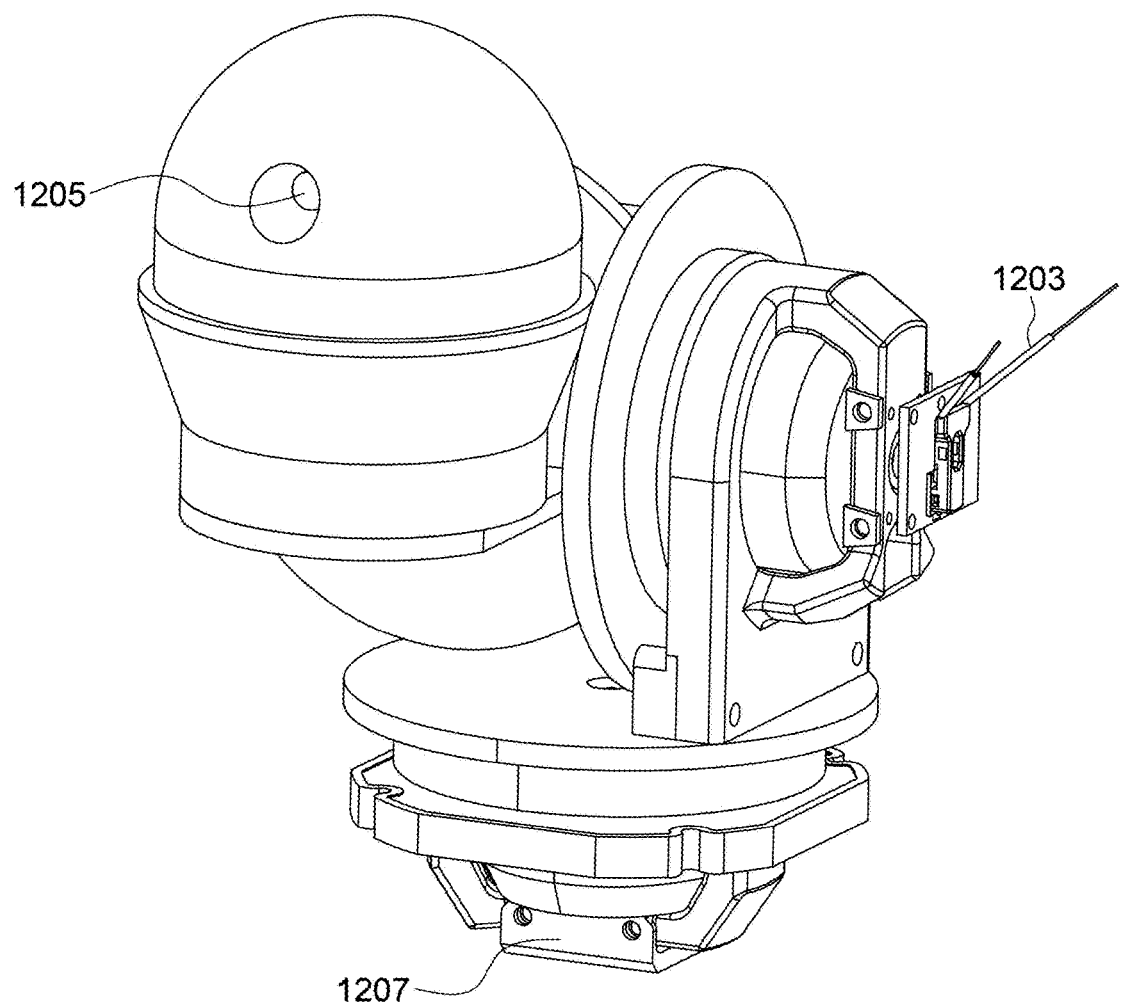
FIG. 12 illustrates a view of an exemplary AI robot, in accordance with at least one embodiment.

FIG. 12 illustrates a view of an exemplary AI robot, in accordance with at least one embodiment. FIG. 12 depicts a camera lens 1203, gimbal 1205, and an antenna 1207.

Figure 13A:
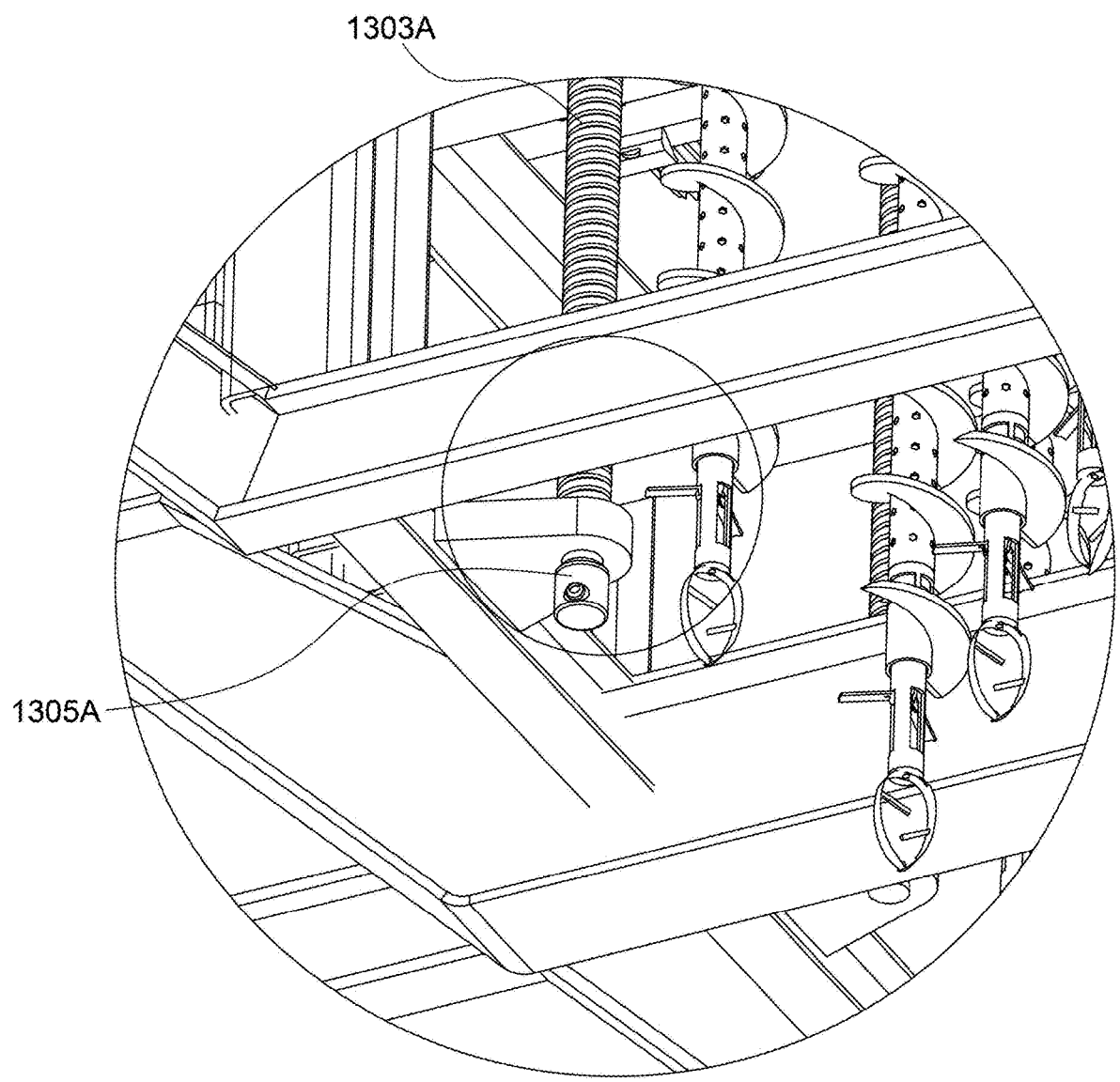
FIG. 13A illustrates a view of an exemplary encoder for lead screw revolution counting, in accordance with at least one embodiment.

FIG. 13A illustrates a view of an exemplary encoder for lead screw revolution counting, in accordance with at least one embodiment. FIG. 13A depicts a lead screw 1303A, and an encoder 1305A.

Figure 13B:
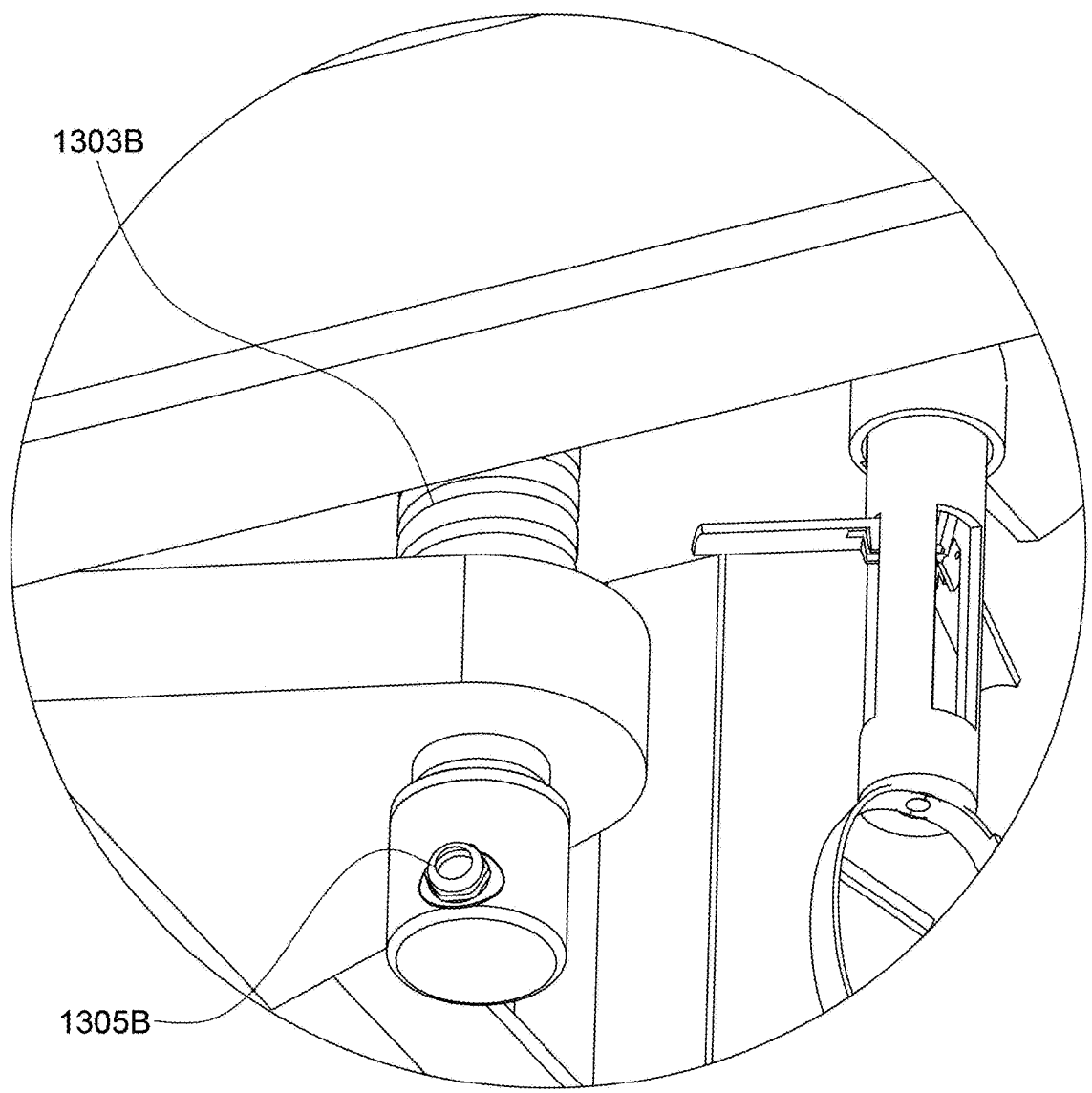
FIG. 13B illustrates a view of an example is a close-up of FIG. 13A is an encoder for lead screw revolution counting, in accordance with at least one embodiment.

FIG. 13B illustrates a view of an example is a close-up of FIG. 13A is an encoder for lead screw revolution counting, in accordance with at least one embodiment. FIG. 13B depicts a lead screw 1303B, and encoder 1305B.

Figure 14:
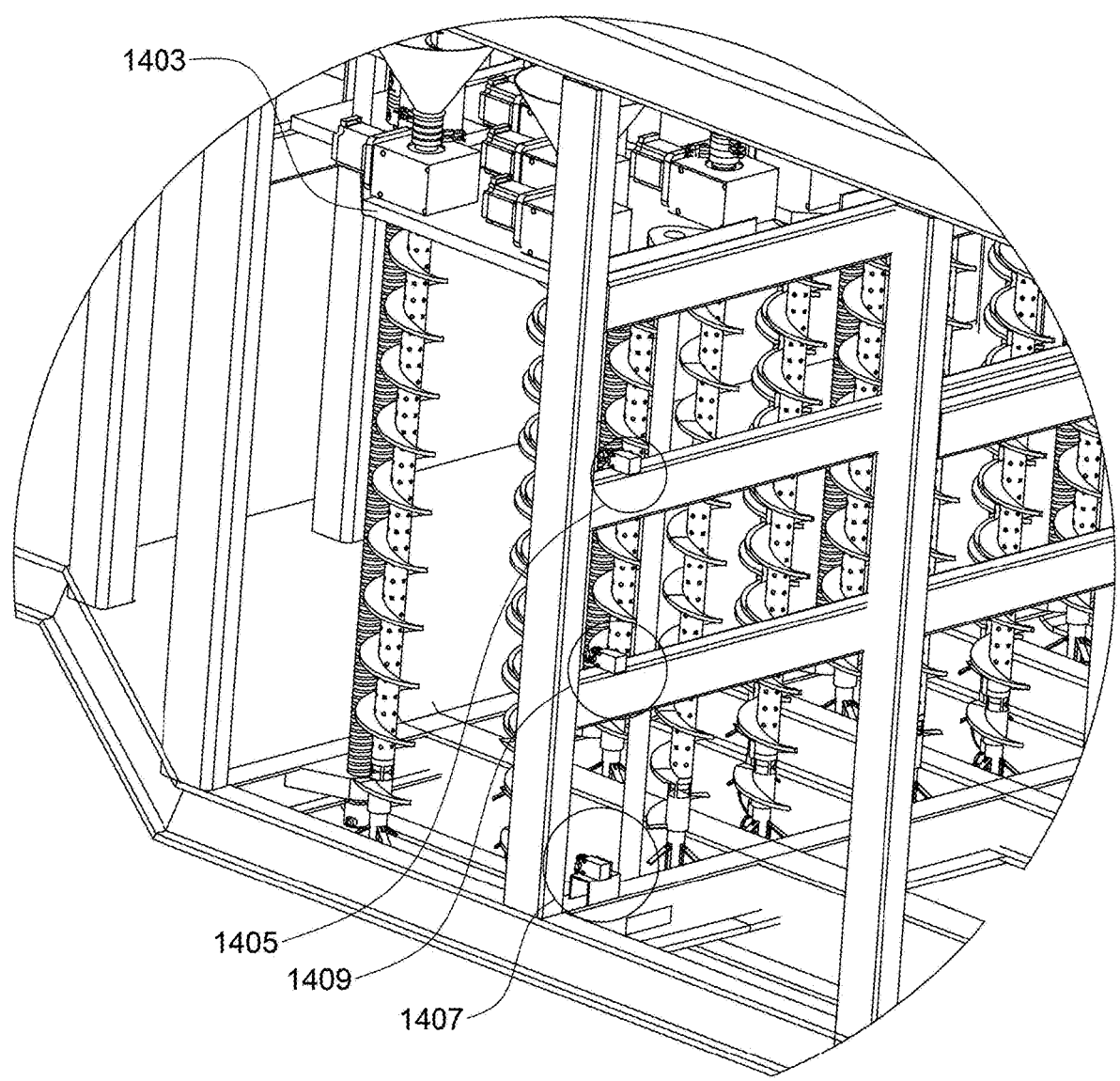
FIG. 14 illustrates a view of an exemplary view of three limit switches, in accordance with at least one embodiment.

FIG. 14 illustrates a view of an exemplary view of three limit switches, in accordance with at least one embodiment. FIG. 14 depicts an injection drill bit array platform 1403, limit switch 1405, limit switch 1407, and a limit switch 1409.

Figure 15A:
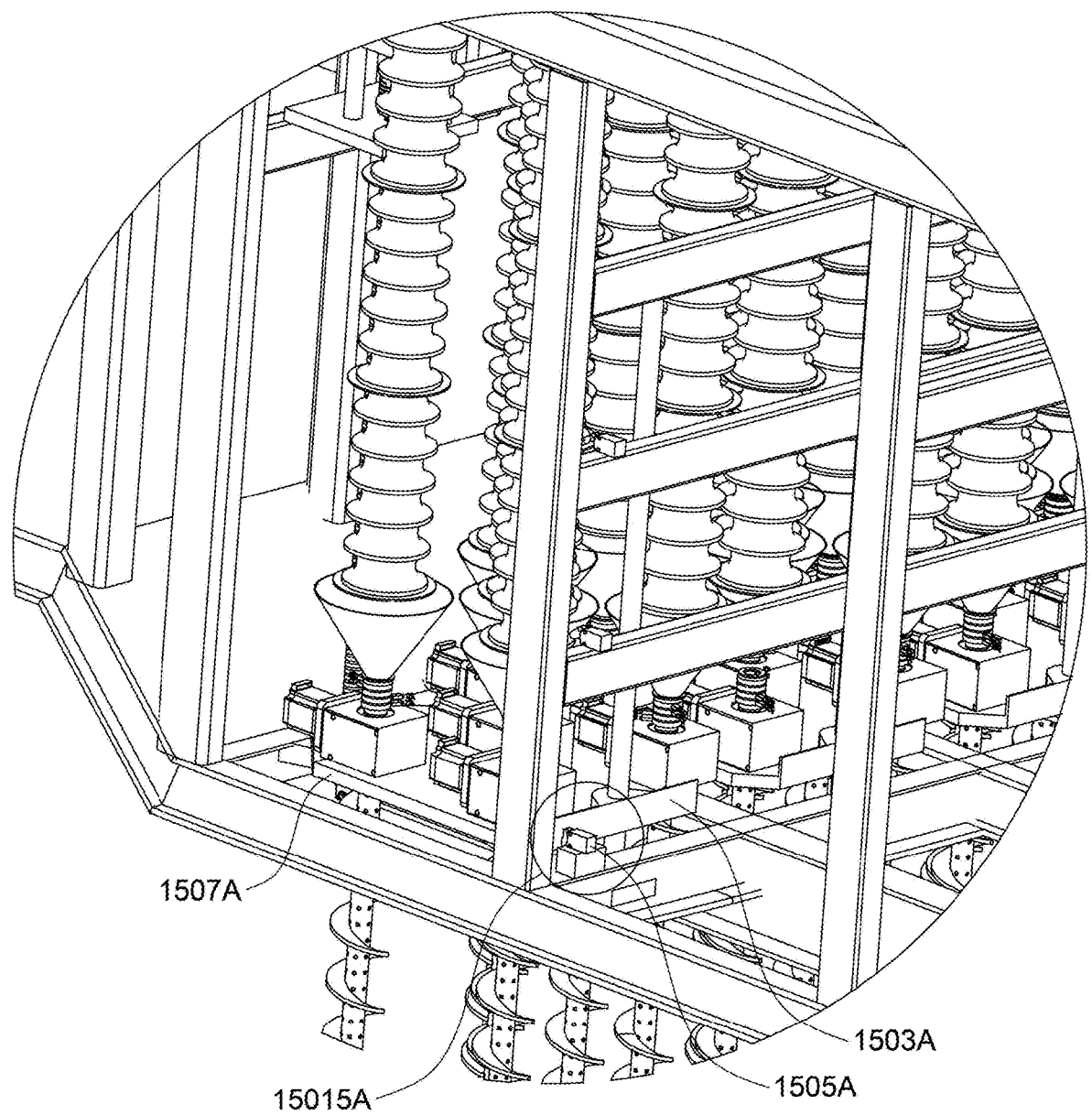
FIG. 15A illustrates a view of an exemplary limit switch that has been tripped by the injection drilling array platform having traveled to its limit setting, in accordance with at least one embodiment.

FIG. 15A illustrates a view of an exemplary limit switch that has been tripped by the injection drilling array platform having traveled to its limit setting, in accordance with at least one embodiment. FIG. 15A depicts a back wall of drilling array platform 1503A, a limit switch 1505A, drilling array platform 1507A, and a call out for close up of FIG. 10B (1509A).

Figure 15B:
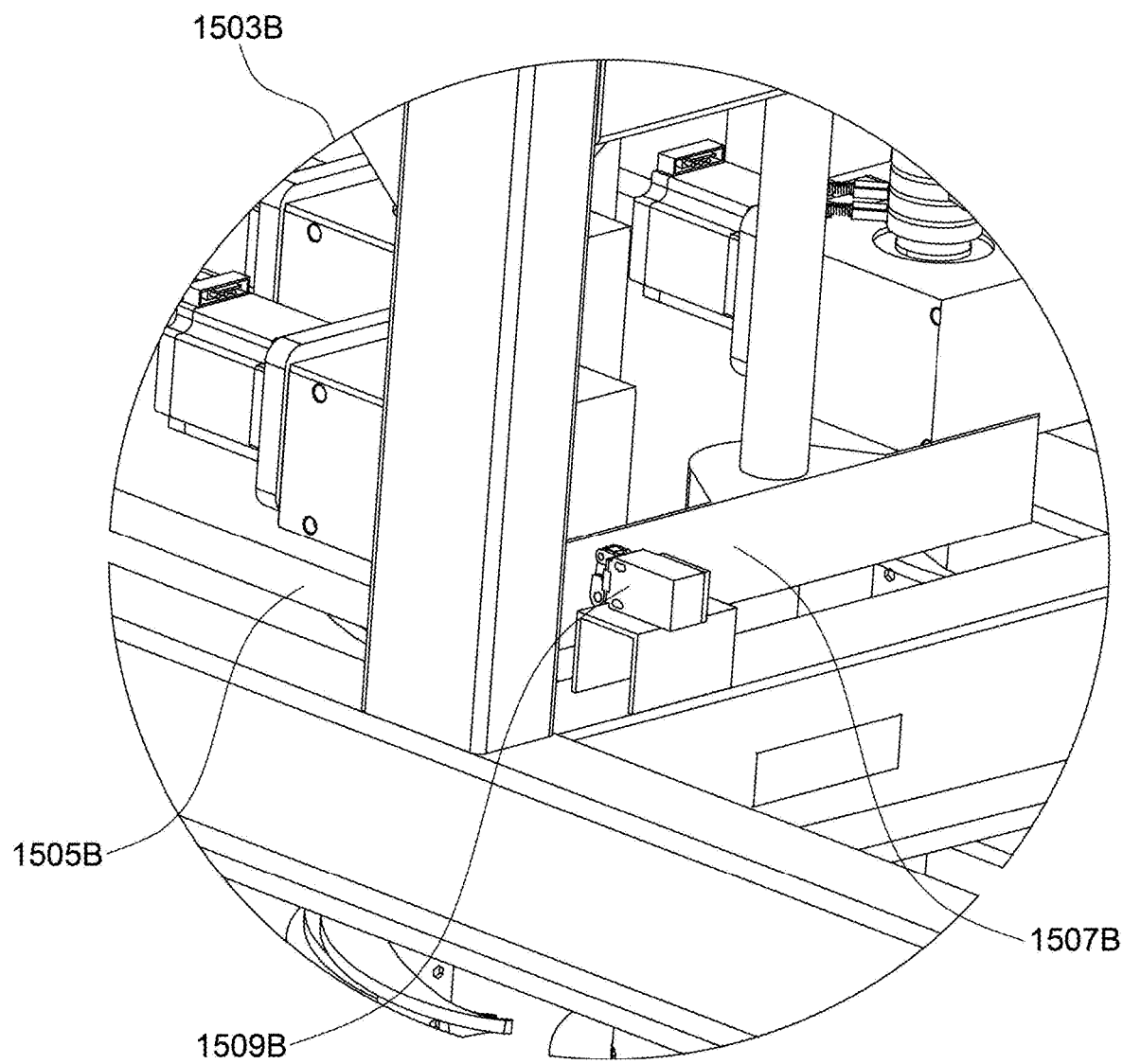
FIG. 15B illustrates a view of an example is a close-up of FIG. 15A, in accordance with at least one embodiment.

FIG. 15B illustrates a view of an example is a close-up of FIG. 15A, in accordance with at least one embodiment. FIG. 15B depicts a close-up of FIGS. 10A and 1009A (1503B), a drilling array platform 1505B, a back wall of drilling array platform 1507B, and a limit switch 1509B.

The present specification specifically describes an apparatus for injecting a plurality of constituents by confining the constituents in one or more tubes. In an embodiment, the apparatus is a hollow elongated cylinder. The apparatus includes an outer tube (1015D); a tube; a global positioning satellite (GPS) (1113C); a programmable logic controller (PLC) (1105C); an Artificial intelligence (AI) robot (1107C, and 1205); a computer (1111C); an encoder (1305B); a plurality of limit switches (1405, 1407, and 1409), and a spacer tube (1015D).

The outer tube (1015D) includes a plurality of stackable tubes (1003D, 1005D, 1007D, 1009D, 1011D, and 1013D). The stackable tubes (1003D, 1005D, 1007D, 1009D, 1011D, and 1013D) are stackable either in one or more cylinder segments or one or more polygonal shapes. The stackable tubes (1003D, 1005D, 1007D, 1009D, 1011D, and 1013D) have diameters smaller than the diameter of a hollow shaft injection drill bit (200A and 400A) to enable lateral ejection. The constituents confined in the stackable tubes (1003D, 1005D, 1007D, 1009D, 1011D, and 1013D) are ejected through a plurality of apertures for an injection purpose. The stackable tubes (1003D, 1005D, 1007D, 1009D, 1011D, and 1013D) includes a lid (1017D) and a plurality of perforations. The stackable tubes (1003D, 1005D, 1007D, 1009D, 1011D, and 1013D) enable prescriptive habitat and/or amendment elements at specific depths determined by the GPS location (1113C) and the encoder (1305B) or the plurality of limit switches (1405, 1407, and 1409) communicating to the PLC (1105C), the AI robot (1107C, and 1205), and the computer (1111C). The spacer tube (1015D) holds a secondary tube for ejection or with or without matching perforations to the shaft hollow injection drill bit and spacer perforations. The AI robot (1107C and 1205) through thermal imaging obtains the temperature of the ground to determine the quantity and/or a plurality of supportive habitat injection tubes and/or a plurality of heating tubes. The encoder (1305B) revolutions per minute equal soil density by ternary scale (resistance) which can be measured by the resistance of revolutions per minute and be determinate of porosity constituents filling tube. The encoder (1305B) determines the precision use targeted depth of any part of an auger assembly (600B) and the distance the auger assembly (600B) has traveled for the ejection of one of the tubes or filling of one of the tubes and subsequent ejection of tube contents. The limit switches (1405, 1407, 1409) determine depth, in some cases a maximum depth for the tubes for the ejection of one of the tubes or filling of one of the tubes and subsequent ejection of the tube contents. The tubes are ejected at or above the maximum drilling depth verified by either the encoder (1305B) or the limit switch (1405, 1407, and 1409) of the hollow shaft injection drill bit (200A and 400A).

In an embodiment, the stackable tubes (1003D, 1005D, 1007D, 1009D, 1011D, and 1013D) act as spacers (1015D) to reduce the internal dimension (ID) of the hollow shaft injection drill bit (200A and 400A).

In an embodiment, the stackable tubes (1003D, 1005D, 1007D, 1009D, 1011D, and 1013D) comprising one or more fixtures to support a plurality of devices (909C).

In an embodiment, the stackable tubes (1003D, 1005D, 1007D, 1009D, 1011D, and 1013D) comprising a plurality of detachable fixtures such as the Fresnel lens (907C), wherein the Fresnel lens (907C) with the tube loaded with zeolites warm the roots in a freeze by adding water in the evening, wherein the zeolites are a battery for heat released by the water.

In an embodiment, the apparatus includes an injection drilling bit that includes a bottom aperture that is closed via an inserted tube with an actuated tube aperture (407C) to enhance lateral ejection.

In an embodiment, the stackable tubes (1003D, 1005D, 1007D, 1009D, 1011D, and 1013D) are layered with stainless steel (1007C), copper (Cu) (1005C), and then stainless steel (1009C) to preserve heat.

In an embodiment, the stackable tubes (1003D, 1005D, 1007D, 1009D, 1011D, and 1013D) have removable inserts such as a solid or woven sock (805B).

In an embodiment, the stackable tubes (1003D, 1005D, 1007D, 1009D, 1011D, and 1013D) contain a bottom closed aperture that is opened for dispensing by mechanical means (407C) or activated by physical pressure (105D).

In an embodiment, the bottom aperture of the injection drilling bit is closed via an inserted tube with an elastomer aperture (105D) to enhance lateral ejection.

In an embodiment, the bottom aperture of the injection drilling bit is closed via the inserted tube with a solid dish-head (713C) to enhance lateral ejection.

In an embodiment, the constituents are ejected vertically or laterally-through the one or more perforations present in the wall sub-surface of the tubes to enable constituent amendment or sequestration.

In an embodiment, when the bottom apertures are closed to protect the constituents from soil or water penetration.

In an embodiment, the stackable tubes (1003D, 1005D, 1007D, 1009D, 1011D, and 1013D) are ejected with constituents partially sub-surface with the remaining length purposefully positioned above the surface.

In an embodiment, the stackable tubes (1003D, 1005D, 1007D, 1009D, 1011D, and 1013D) ejection is directed by the GPS (1113C) to control the X plane and Y plane injection coordinates.

In an embodiment, the apparatus injects living organisms within one or more hatchery tubes to provide habitat support after placement.

In an embodiment, the apparatus includes a mesh insert to enable larger perforations of the stackable tubes (1003D, 1005D, 1007D, 1009D, 1011D, and 1013D) for filtering above the surface and subsurface of the root zone.

If the length of the tube is greater than the targeted depth of an ejected tube, part of the tube remains above the surface (705D).

In an embodiment, the tubes open or close lateral perforations with a different loaded internal tube (207B, 305B, and 309B) or by rotating the same tube into open and closed positions.

In an embodiment, the tube perforation patterns (305B) or lack thereof enables a plurality of hollow shaft injection drill bit arrays to not need re-tooling for specific hole injection of prescriptive amendments.

In an embodiment, some of the tubes have a much smaller diameter than the hollow shaft injection drill bit (200A and 400A), creating an annulus and enabling outside the circumference or perimeter the ejection placement of straw, nutshells, or other abrasive matter to mitigate smearing.

In an embodiment, the tubes have larger holes (807A) than the hollow shaft injection drill bit (200A and 400A), enabling the lateral ejection placement of straw, nutshells, or other abrasive matter to migrate through injection and mitigate smearing.

In an embodiment, the tubes that are ejected may have beveled edges (403C) and spiked shapes or tines to mitigate smearing.

In an embodiment, the tubes enable the closing of lateral zones (409B, and 413B) by the tube insertion inside the hollow shaft injection drill bit (200A and 400A) with the tube that has a bottom aperture (407C).

In an embodiment, the tubes (407C) and (105B) enable protection from bottom incursions of the soil into the hollow shaft injection drill bit (200A and 400A) by having an aperture that closes.

In an aspect, the tubes modify the volume of the hollow shaft injection drill bit (200A and 400A) enabling a smaller diameter (403A) and the subsequent volume of a constituent at targeted prescriptive levels and depths.

In an embodiment, the tops of tubes (705C) may be unscrewed or hinged or pressure fitted so that they may be fitted with observation equipment such as radar, wave pulses, sonic devices, and image capture equipment such as cameras.

In an embodiment, the tube socks (805B) with perforations are removed with spent or adsorbed soil constituents that have a monetary value.

In an embodiment, the tube with an outer housing (1015D) has multiple small tubes (1003D, 1005D, 1007D, 1009D, 1011D, 1013D) with caps, and each section with caps and or hemispheres that can be ejected which enable loading to minimize and or eliminate damage of biologicals or other fragile amendments.

In an embodiment, the tube is made of transparent material (705C) such as plastic and ejected into the soil with an enclosed removable or stationary lid for the top or bottom end-caps (dish-head) of the tube.

In an embodiment, the perforated tubes or stackable tubes (1003D, 1005D, 1007D, 1009D, 1011D, 1013D) are ejected with a colony of live matter such as but not exhaustive examples of nematodes, bees, and earthworms in any stage of development, wherein the tube may be made from any material including biodegradable materials and also filled with habitat materials.

In an embodiment, the perforated tubes (1003D, 1005D, 1007D, 1009D, 1011D, 1013D) are ejected with a Fresnel lens fixture (907C) and filled with zeolites, wherein the perforated tube is made from any thermally conductive material.

In an embodiment, the tube lid or aperture is removable (803C), for the harvesting or retrieval of partially or fully saturated or exhausted constituents and or replacement of constituents.

In an embodiment, the cone-shaped lids (705D) are corrugated with ribs to further enable rainwater to shed away from the tube.

In an embodiment, the tubes are ejected with or without a bottom or top enclosure.

In an embodiment, the tube (1005A) may be clear, transparent, or neutral to enhance infrared camera penetration.

In an embodiment, the tubes have top removable lids (803C).

In an embodiment, the tube lids may be in the shape of a cone (705D) and when at ground level enable food such as ground leaves or pollen topically applied around the cone for an eco-colony habitat.

In an embodiment, the tube lids may have the ability to screw FIG. 7C 705C on or press in to form a seal (803C).

In an embodiment, the tube lids that have threads (705C) may be removable to replace the contents of the tube once placed in the soil or partially above the soil.

In an embodiment, the tube lids may be in the shape of a cone (705D) that enables rainwater to shed away from the tube.

In an embodiment, the cone-shaped lids (705D) enable more surface area when sprayed with pheromones or pollen to attract specific biologicals.

In an embodiment, the tubes may have lids at the bottom (1005A) or fully-formed bottoms (507B).

In an embodiment, the tubes may have a chord as part of or in place of a flange.

In an embodiment, the tubes may have an elastomer bottom (105B) enclosing the aperture.

In an embodiment, the tubes may have an electromagnet spring 312C loaded aperture actuated at depth and GPS location (1143C) and encoder (1305B) or limit switches (1405, 1407, and 1409) communicating to PLC (1105C), AI robot (1107C and 1205), computer (1111C) program.

In an embodiment, the tube perforations may match prescriptive targeted zones whose deployment will enhance lateral injections 309B.

In an embodiment, the tube caps, lids, and bottoms may be perforated 909A.

In an embodiment, the tube caps, lids, and bottoms may not be perforated (1017D).

In an embodiment, the tube caps, lids, bottoms, or tops may be an aperture or valve.

In an embodiment, the tube perforations may match (207B) the hollow shaft injection drill bit perforations.

In an embodiment, the tube perforations (305 and 309B) can match only a portion of the hollow shaft injection drill bit.

In an embodiment, the tube lids may have fixtures (913A) that are attached and removable.

In an embodiment, the tubes may not be fully submerged sub-surface and may be part of an array to filter runoff waters (705D).

In an embodiment, the tube caps or lids may not be fully submerged (705D) to enable rain or irrigation water shedding from the eco colony habitat.

In an embodiment, the tubes may not be submerged to enable shedding rain or irrigation water 705D from the eco colony habitat.

In an embodiment, the tubes or tube lids may contain a spout (905C).

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

FIG. 1:
103A Flange
105A Non Perforated Tube
107A Elastomer Segmented Cap
FIG. 1B
103B Tube Stem
105B Fully Closed Elastomer Segmented Cap
FIG. 1C
103C Tube Stem

105C Partially Open Elastomer Segmented Cap
FIG. 1D
103D Tube Stem
105D Fully Open Elastomer Segmented Cap
FIG. 2A
203A Hollow Perforated Stem Injection Drill Bit Flange
205A Hollow Non Perforated Segment of Injection Drill Bit Stem
207A Perforations
209A Injection Drill Bit Screw Rib
FIG. 2B
203B Tube Flange
205B Non Perforated Portion of Injection Drill Bit Tube
207B Perforations
209B Hollow Bottom
FIG. 2C
203C Tube Stem or Shaft
205C Tube Perforation
207C Hollow Bottom Tube
FIG. 3A
303A Injection Drill Bit with perforations
FIG. 3B
303B Injection Drill Bit Cross-Section of Injection Drill Bit Tube
305B Strata specific perforations
307B No perforations hollow stem
309B Lower Strata specific perforations
311B Electromagnetic Spring Injection Drill Bit Tube Cap
FIG. 3C
303C Hollow Stem Wall
305C Perforations
307C Electrical Wires
309C Injection Drill Bit Auger Screw
311C Electromagnetic Spring Injection Drill Bit Tube Cap
313C Electromagnetic Spring Injection Drill Bit Cap
FIG. 4A
403A Hollow Stem of Injection Drill Bit
405A Flange
407A No Perforations on Hollow Stem of Injection Drill Bit
409A Injection Drill Bit Screw Rib
411A Injection Drill Bit Perforations
413A Injection Drill Bit Hollow Open Bottom
FIG. 4B
403B Injection Drill Bit Tube Hollow Entry
405B Flange
407B No Perforations
409B Strata Perforations
411B No Perforations
413B Lower Strata Perforations
415B Electromagnetic Spring Tube Cap
FIG. 4C
403C Close-up of FIG. 4B and #415B showing polygon lower strata perforation shape
405C No Perforations in Tube
407C Close-up of FIG. 4B and #415B showing Electromagnetic Spring Tube Aperture
FIG. 5A
503A Tube Flange
505A Non Perforated Tube Shaft
507A Perforated Tube Shaft
509A Call Out for FIG. 5B
FIG. 5B
503B Non Perforated Tube Shaft
505B Perforated Tube Shaft
507B Non-perforated Dish Head
FIG. 6A
603A Fully inserted tube
FIG. 6B
603B Perforations in Hollow Shaft Injection Drill Bit
605B Gearbox
607B Hopper
609B Motor
611B Platform
613B Hollow Shaft Injection Drill Bit
615B Hollow Shaft Injection Drill Bit
617B Hollow Shaft Injection Drill Bit
619B Hollow Shaft Injection Drill Bit
621B Hollow Shaft Injection Drill Bit
FIG. 7A
703A Cone Cap or Lid
705A Perforation Exposing Mesh Sock
707A Perforation within shaft of tube
709A Dish Cap or Lid
FIG. 7B
703B Tube
705B Perforation Exposing Mesh Sock
FIG. 7C
703C Cone Cap or Lid
705C Cone Cap or Lid threads
707C Tube Body or Shaft
709C Perforation Exposing Mesh Sock
711C Perforation within shaft of tube
713C Dish Cap or Lid
FIG. 7D
703D Tube Body or Shaft Sub Surface
705D Cone Cap or Lid
707D Ground
FIG. 8A
803A Cap or Lid
805A Tube Body or Shaft
807A Perforation Exposing Mesh Sock
809A Perforation within shaft of tube
811A Dish Cap or Lid
FIG. 8B
803B Tube
805B Close up of Perforation Exposing Mesh Sock
FIG. 8C
803C Cap or Lid
805C Tube Body or Shaft
FIG. 8D
803D Flat Lid or Cap Flange
805D Interior circumferential lid rim affixed to flange
807D Tube Body or Shaft
FIG. 9A
903A Constituent Spout
905A Lid or Cap Flange
907A Tube or Shaft
909A Perforated Cap
911A Fresnel Lens
913A Support Structure for #911A
FIG. 9B
903B Tube or Shaft
905B Cap
907B Perforations
FIG. 9C
903C Tube or Shaft
905C Constituent Spout
907C Fresnel Lens
909C Support Structure for #907C
911C Lid or Cap Flange
FIG. 10A

1003A Transparent Lid
1005A Stackable Transparent Tube
1007A Transparent Lid
1009A Transparent Lid
FIG. 10B
1003B Transparent Lid
1005B Stackable Transparent Tube
1007B Stackable Transparent Tube
1009B Stackable Transparent Tube
1011B Stackable Transparent Tube
1013B Stackable Transparent Tube
1015B Stackable Transparent Tube
1017B Transparent Lid
1019B Outer Tube Housing for Stackable Transparent Tubes
FIG. 10C
1003C Lid
1005C Stackable Tube
1007C Outer Tube Housing for Stackable Tubes
FIG. 10D
1003D Lid
1005D Stackable Tube
1007D Stackable Tube
1009D Stackable Tube
1011D Stackable Tube
1013D Stackable Tube
1015D Outer Tube Housing for Stackable Tubes
FIG. 11A
1103A Satellite Communications Dish
1105A Communications Platform containing components seen in FIG. 11C
FIG. 11B
1103B Satellite Communications Dish
FIG. 11C
1103C Fuel Cell
1105C PLC
1107C AI Robot
1109C Router
1111C Computer
1113C GPS
FIG. 12
1203 Camera Lens
1205 Gimbal
1207 Antenna
FIG. 13A
1303A Lead Screw
1305A Encoder
FIG. 13B
1303B Lead Screw
1305B Encoder
FIG. 14
1403 Injection Drill Bit Array Platform
1405 Limit Switch
1407 Limit Switch
1409 Limit Switch
FIG. 15A
1503A Back Wall of Drilling Array Platform
1505A Limit Switch
1507A Drilling Array Platform
1509A Call Out for Close Up of FIG. 10B
FIG. 15B
1503B Close Up of FIG. 10A and #1009A
1505B Drilling Array Platform
1507B Back Wall of Drilling Array Platform
1509B Limit Switch

The invention claimed is:

1. An apparatus for injecting a plurality of constituents by confining the constituents in one or more tubes, the apparatus comprising:
   an outer tube;
   one or more stackable tubes housed in the outer tube;
   a global positioning satellite (GPS);
   a programmable logic controller (PLC);
   an artificial intelligence (AI) robot;
   a computer;
   an encoder;
   a plurality of limit switches, wherein the stackable tubes are stackable either in one or more cylinder segments or one or more polygonal shapes, wherein the stackable tubes have diameters smaller than the diameter of a hollow shaft injection drill bit to enable lateral ejection of prescriptive habitat and/or amendment elements to the surrounding soil, wherein the constituents confined in the stackable tubes are ejected through a plurality of apertures formed in the outer tube for an injection purpose, wherein the stackable tubes comprise a lid and a plurality of perforations, wherein the stackable tubes enable the ejection of the prescriptive habitat and/or amendment elements at specific depths determined by the GPS location and the encoder or the plurality of limit switches communicating to the PLC, the AI robot, and the computer, and
   a secondary tube for ejection of additional constituents from one or more additional stackable tubes with or without perforations matching corresponding perforations of the hollow shaft injection drill bit,
   wherein the AI robot through thermal imaging obtains the temperature of the ground to determine a quantity of prescriptive habitat and/or amendment elements in the one or more additional stackable tubes and/or a plurality of heating tubes,
   wherein the encoder revolutions per minute determine soil density by a ternary scale, in which the soil density is measured by the resistance of revolutions per minute and is determinate of a porosity of constituents filling the one or more additional stackable tubes,
   wherein the encoder determines the precision use targeted depth of any part of an auger assembly and the distance the auger assembly has traveled for the ejection of the constituents of the one or more stackable tubes or to determine the constituents filling the one or more additional stackable tubes with tube contents and subsequent ejection of the tube contents,
   wherein the limit switches determine depth, in some cases a maximum depth the ejection of the constituents of the one or more additional stackable tubes or filling of the one or more additional stackable tubes with tube contents and subsequent ejection of the tube contents,
   wherein the tubes are ejected at or above the maximum drilling depth verified by either the encoder or by at least one of the plurality of limit switches of the hollow shaft injection drill bit.

2. The apparatus as claimed in claim 1, wherein at least one of the stackable tubes acts as a spacer to reduce the internal dimension (ID) of the hollow shaft injection drill bit.

3. The apparatus as claimed in claim 1, wherein the stackable tubes comprise one or more fixtures configured to support a plurality of devices.

4. The apparatus as claimed in claim 1, wherein the stackable tubes comprise a plurality of detachable fixtures such as a Fresnel lens, wherein the Fresnel lens with the tube loaded with zeolites warm the roots in a freeze by adding water in the evening, wherein the zeolites are a battery for heat released by the water.

5. The apparatus as claimed in claim 1 wherein the hollow shaft injection drill bit includes a bottom aperture that is closed via an inserted tube with an actuated tube aperture to enhance the lateral ejection.

6. The apparatus as claimed in claim 5, wherein the bottom aperture of the injection drilling bit is closed via an inserted tube with an elastomer aperture to enhance the lateral ejection.

7. The apparatus as claimed in claim 5, wherein the bottom aperture of the injection drilling bit is closed via the inserted tube with a solid dish-head to enhance the lateral ejection.

8. The apparatus as claimed in claim 1, wherein the constituents are ejected vertically or laterally-through the plurality of perforations present in the stackable tubes to enable sub-surface amendment or sequestration.

9. The apparatus as claimed in claim 1, wherein when the hollow shaft injection drill bit includes a bottom aperture that is closed to protect the constituents from soil or water penetration.

10. The apparatus as claimed in claim 1, wherein the stackable tubes are ejected with constituents partially sub-surface with a remaining length purposefully positioned above the surface.

11. The apparatus as claimed in claim 1, wherein the ejection from the stackable tubes is directed by the GPS to control the X plane and Y plane injection coordinates.

12. The apparatus as claimed in claim 1 the ejection from the stackable tubes injects living organisms within one or more hatchery tubes to provide habitat support after placement.

13. The apparatus as claimed in claim 1 comprises a mesh insert to enable larger perforations of the stackable tubes for filtering above the surface and subsurface of the root zone.

14. The apparatus as claimed in claim 1, wherein, if the length of the outer tube is greater than the targeted depth of an ejected tube, part of the outer tube remains above the surface during the ejection.

15. The apparatus as claimed in claim 1, wherein the outer an secondary tubes open or close lateral perforations with a different loaded internal tube or by rotating the outer tube or the secondary tube into respective open and closed positions.

16. The apparatus as claimed in claim 1, wherein a perforation pattern of the stackable tubes, or lack thereof, enables a plurality of hollow shaft injection drill bit arrays to not need re-tooling for specific hole injection of prescriptive amendments.

17. The apparatus as claimed in claim 1, wherein at least one of the stackable tubes have a much smaller diameter than the hollow shaft injection drill bit, wherein the much smaller diameter creates an annular space which enables a placement of straw, nutshells, or other abrasive matter in the annular space to mitigate smearing.

18. The apparatus as claimed in claim 1, wherein the outer and secondary tubes have larger holes than the hollow shaft injection drill bit, wherein the larger holes enables the lateral ejection of straw, nutshells, or other abrasive matter to migrate through injection and mitigate smearing.

19. The apparatus as claimed in claim 1, wherein the outer and secondary tubes that are ejected may have beveled edges and spiked shapes or tines to mitigate smearing.

20. The apparatus as claimed in claim 1, wherein the outer and secondary tubes enable closing of lateral zones by the insertion at least one of the outer and secondary tube inside the hollow shaft injection drill bit with the at least one of the outer and secondary tube having a bottom aperture.

21. The apparatus as claimed in claim 1, wherein the outer and secondary tubes and enable protection from bottom incursions of the soil into the hollow shaft injection drill bit by having an aperture that closes.

22. The apparatus as claimed in claim 1, wherein the outer and secondary tubes modify the volume of the hollow shaft injection drill bit enabling a smaller diameter and the subsequent volume of a constituent at targeted prescriptive levels and depths.

23. The apparatus as claimed in claim 1, wherein the tops of the outer and secondary tubes may be unscrewed or hinged or pressure fitted so that they may be fitted with observation equipment such as radar, wave pulses, sonic devices, and image capture equipment such as cameras.

24. The apparatus as claimed in claim 1, wherein at least one of the outer and secondary tubes comprises a tube sock with perforations, the tube sock being removable with spent or adsorbed soil constituents that have a monetary value.

25. The apparatus as claimed in claim 1, wherein at least one of the outer and secondary tube has multiple small tubes with caps, and each section with caps and or hemispheres that can be ejected which enable loading to minimize and or eliminate damage of biologicals or other fragile amendments.

26. The apparatus as claimed in claim 1, wherein at least one of the outer and secondary tube is made of transparent material such as plastic and ejected into the soil with an enclosed removable or stationary lid for the top or bottom end-caps of the at least one of the outer and secondary tube.

27. The apparatus as claimed in claim 1, wherein the stackable tubes are ejected with a colony of live matter including at least one of nematodes, bees, and earthworms in any stage of development, wherein the tube is made from biodegradable materials and also filled with habitat materials.

28. The apparatus as claimed in claim 1, wherein at least one of the stackable tubes are ejected with a Fresnel lens fixture and filled with zeolites, wherein the at least one of the stackable tubes is made from any thermally conductive material.

29. The apparatus as claimed in claim 1, wherein the lid is removable, for the harvesting or retrieval of partially or fully saturated or exhausted constituents and or replacement of constituents.

30. The apparatus as claimed in claim 1, wherein the lid is cone-shaped and corrugated with ribs to renable rainwater to shed away from the tube.

* * * * *